United States Patent
Pedan et al.

(10) Patent No.: US 11,716,679 B2
(45) Date of Patent: Aug. 1, 2023

(54) METHOD AND DEVICE FOR DETERMINING PROXIMITY

(71) Applicant: Samsung Electronics Co., Ltd., Suwon-si (KR)

(72) Inventors: Stanislav Pedan, Kyiv (UA); Mykola Alieksieiev, Kyiv (UA); Roman Gush, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/005,615

(22) Filed: Aug. 28, 2020

(65) Prior Publication Data

US 2021/0068047 A1    Mar. 4, 2021

(30) Foreign Application Priority Data

Sep. 2, 2019   (KR) ........................ 10-2019-0108459

(51) Int. Cl.
  *H04W 48/18*   (2009.01)
  *H04W 64/00*   (2009.01)
  (Continued)

(52) U.S. Cl.
  CPC ............ *H04W 48/18* (2013.01); *G06F 3/017* (2013.01); *G06F 3/0482* (2013.01); *H04W 64/00* (2013.01); *H04W 84/12* (2013.01)

(58) Field of Classification Search
  CPC ........ G06F 3/017; G06F 21/35; G06F 3/0482; G06F 21/44; H04W 12/68; H04W 48/18;
  (Continued)

(56) References Cited

U.S. PATENT DOCUMENTS 9,157,991 B2 * 10/2015 Lipman ................. H04W 24/00
9,170,325 B2 * 10/2015 Zhang .................... G01S 11/14
(Continued)

FOREIGN PATENT DOCUMENTS

CN          105807935 B  *  1/2019  ............ G06F 3/017
KR     10-2014-0029125 A      3/2014
(Continued)

OTHER PUBLICATIONS

Cong Shi, Jian Liu, Hongbo Liu, and Yingying Chen. 2017. Smart User Authentication through Actuation of Daily Activities Leveraging WiFi-enabled IoT. In Proceedings of Mobihoc '17, Chennai, India, Jul. 2017, 10 pages (Year: 2017).*

(Continued)

*Primary Examiner* — Andrew L Tank
(74) *Attorney, Agent, or Firm* — Jefferson IP Law, LLP

(57) ABSTRACT

An electronic device of determining proximity of a wireless external device is provided. The electronic device includes a transceiver, a sensor, and at least one processor, wherein the at least one processor is configured to transmit a first signal to the external device through the transceiver, acquire, when the first signal is transmitted, information about a user's gesture made in a vicinity of a sensor positioned within a certain distance from the transceiver through the sensor, wherein the first signal is distorted by the user's gesture and provided to the external device, receive, from the external device through the transceiver, a second signal generated as the external device copies the distorted first signal, and determine the proximity of the external device based on the second signal.

21 Claims, 16 Drawing Sheets

(51) Int. Cl.
*G06F 3/0482* (2013.01)
*G06F 3/01* (2006.01)
*H04W 84/12* (2009.01)

(58) Field of Classification Search
CPC ..... H04W 64/00; H04W 84/12; H04W 84/18; H04W 12/06; H04W 12/63; H04W 92/18; H04W 12/50; H04W 4/023; H04W 8/005; H04W 48/04; G01S 5/02; G01S 5/0249; G01S 5/0295; G06K 9/00355
See application file for complete search history.

(56) References Cited

U.S. PATENT DOCUMENTS

| | | | |
|---|---|---|---|
| 9,298,333 B2 | 3/2016 | Gay | |
| 9,615,391 B2* | 4/2017 | Fischer | H04W 4/80 |
| 9,629,201 B2* | 4/2017 | Chen | H04L 43/16 |
| 10,007,355 B2* | 6/2018 | Schorsch | H04W 12/033 |
| 10,382,614 B2 | 8/2019 | Novet | |
| 10,409,385 B2* | 9/2019 | Poupyrev | G01S 13/42 |
| 10,955,983 B2 | 3/2021 | Post et al. | |
| 2003/0220765 A1* | 11/2003 | Overy | H04L 63/1466 |
| | | | 702/158 |
| 2004/0179545 A1* | 9/2004 | Erola | H04W 92/18 |
| | | | 370/449 |
| 2007/0121097 A1* | 5/2007 | Boillot | G01S 15/104 |
| | | | 356/28 |
| 2014/0113591 A1 | 4/2014 | Takai et al. | |
| 2014/0155031 A1* | 6/2014 | Lee | H04W 12/08 |
| | | | 455/411 |
| 2014/0206288 A1* | 7/2014 | Liu | H04W 12/04 |
| | | | 455/41.2 |
| 2015/0205521 A1 | 7/2015 | Ding et al. | |
| 2015/0223145 A1* | 8/2015 | Yoon | H04W 48/04 |
| | | | 370/328 |
| 2015/0249913 A1* | 9/2015 | Hua | H04W 8/005 |
| | | | 455/41.2 |
| 2015/0356289 A1* | 12/2015 | Brown | H04W 12/06 |
| | | | 726/7 |
| 2016/0011692 A1* | 1/2016 | Heim | H03K 17/955 |
| | | | 345/174 |
| 2016/0070900 A1* | 3/2016 | Kim | G06F 21/34 |
| | | | 726/3 |
| 2016/0084951 A1* | 3/2016 | Park | G01S 13/04 |
| | | | 342/28 |
| 2016/0112839 A1* | 4/2016 | Choi | H04W 4/80 |
| | | | 455/41.2 |
| 2016/0147994 A1 | 5/2016 | Lu | |
| 2016/0198499 A1* | 7/2016 | Lee | H04W 4/026 |
| | | | 455/450 |
| 2016/0205501 A1* | 7/2016 | Lee | H04W 4/02 |
| | | | 455/457 |
| 2016/0224036 A1* | 8/2016 | Baker | H04W 4/02 |
| 2017/0168158 A1* | 6/2017 | Reining | G01S 15/102 |
| 2017/0206057 A1* | 7/2017 | Lee | G06F 3/017 |
| 2017/0208565 A1* | 7/2017 | Lowe | G01S 1/74 |
| 2017/0212210 A1* | 7/2017 | Chen | G01S 5/06 |
| 2017/0229009 A1* | 8/2017 | Foster | G06F 3/016 |
| 2017/0325066 A1 | 11/2017 | Cho et al. | |
| 2019/0020530 A1* | 1/2019 | Au | H04L 5/0057 |
| 2019/0191286 A1* | 6/2019 | Tokumoto | H04W 4/80 |
| 2019/0320407 A1* | 10/2019 | Goyal | H04W 24/10 |
| 2020/0323034 A1* | 10/2020 | Da Silva | H04B 17/336 |

FOREIGN PATENT DOCUMENTS

| | | |
|---|---|---|
| KR | 10-2015-0028762 A | 3/2015 |
| KR | 10-2017-0023651 A | 3/2017 |
| KR | 10-2018-0045037 A | 5/2018 |
| KR | 10-2019-0083470 A | 7/2019 |

OTHER PUBLICATIONS

Al-qaness, M.A.A.; Li, F. WiGeR: WiFi-Based Gesture Recognition System. ISPRS Int. J. Geo-Inf. 2016, 5, 92 (Year: 2016).*
Qifan Pu, Sidhant Gupta, Shyamnath Gollakota, and Shwetak Patel. 2013. Whole-home gesture recognition using wireless signals. In Proceedings of the 19th annual international conference on Mobile computing & networking (MobiCom '13). Association for Computing Machinery, New York, NY, USA, 27-38. (Year: 2013).*
Zheng Yang, Zimu Zhou, and Yunhao Liu. 2013. From RSSI to CSI: Indoor localization via channel response. ACM Comput. Surv. 46, 2, Article 25 (Nov. 2013), 32 pages (Year: 2013).*
H. Han, S. Yi, Q. Li, G. Shen, Y. Liu and E. Novak, "AMIL: Localizing neighboring mobile devices through a simple gesture," IEEE Infocom 2016—The 35th Annual IEEE International Conference on Computer Communications, 2016, pp. 1-9, doi: 10.1109/INFOCOM.2016.7524392 (Year: 2016).*
J. Luo, H. V. Shukla and J. .-P. Hubaux, "Non-Interactive Location Surveying for Sensor Networks with Mobility-Differentiated ToA," Proceedings IEEE INFOCOM 2006. 25th IEEE International Conference on Computer Communications, 2006, pp. 1-12, doi: 10.1109/INFOCOM.2006.190. (Year: 2006).*
H. Abdelnasser, M. Youssef and K. A. Harras, "WiGest: A ubiquitous WiFi-based gesture recognition system," 2015 IEEE Conference on Computer Communications (INFOCOM), 2015, pp. 1472-1480, doi: 10.1109/INFOCOM.2015.7218525. (Year: 2015).*
Mäntyjärvi et al. 2005. Gesture interaction for small handheld devices to support multimedia applications. J. Mob. Multimed. 1, 2 (Jun. 2005), 92-111. (Year: 2005).*
Zheng et al. 2019. Zero-Effort Cross-Domain Gesture Recognition with Wi-Fi. In Proceedings of the 17th Annual International Conference on Mobile Systems, Applications, and Services (MobiSys '19). Association for Computing Machinery, New York, NY, USA, 313-325. https://doi.org/10.1145/3307334.3326081 (Year: 2019).*
Li et al. 2016. WiFinger: talk to your smart devices with finger-grained gesture. In Proceedings of the 2016 ACM International Joint Conference on Pervasive and Ubiquitous Computing (UbiComp '16). Association for Computing Machinery, New York, NY, USA, 250-261. https://doi.org/10.1145/2971648.2971738 (Year: 2016).*
Yu et al. 2018. QGesture: Quantifying Gesture Distance and Direction with WiFi Signals. Proc. ACM Interact. Mob. Wearable Ubiquitous Technol. 2, 1, Article 51 (Mar. 2018), 23 pages, https://doi.org/10.1145/3191783 (Year: 2018).*
International Search Report dated Nov. 30, 2020, issued in International Application No. PCT/KR2020/011652.
Zhang et al., Proximity Based IoT Device Authentication, Microsoft Research1 The Hong Kong University of Science and Technology, May 2017.
Korean Notice of Allowance dated Feb. 24, 2021, issued in Korean Application No. 2019-108459.

* cited by examiner

METHOD AND DEVICE FOR DETERMINING PROXIMITY

CROSS-REFERENCE TO RELATED APPLICATION(S)

This application is based on and claims priority under 35 U.S.C. § 119(a) of a Korean patent application number 10-2019-0108459, filed on Sep. 2, 2019, in the Korean Intellectual Property Office, the disclosure of which is incorporated by reference herein in its entirety.

BACKGROUND

1. Field

The disclosure relates to a method and a device for determining proximity More particularly, the disclosure relates to a method and a device for determining proximity of an external device to which connection is intended.

2. Description of Related Art

The Internet is evolving from a human-based connection network on which humans generate and consume information to an Internet of Things (IoT) network on which distributed components, such as objects transmit and receive information and process it. Internet of Everything (IoE) technology resulting from combining IoT technology with big data processing technology, and the like, through a connection to a cloud server or the like is on the rise. To implement IoT, various technical factors, such as sensing technology, wired/wireless communication, network infrastructure, service interface technology, and security technology, are required. Recently, technologies including a sensor network, machine to machine (M2M), and machine type communication (MTC) for connections between objects are being studied. In an IoT environment, an intelligent Internet Technology (IT) service is provided to collect and analyze data generated by connected objects to create new values for human life. IoT may be applied to various fields, such as smart homes, smart buildings, smart cities, smart cars/connected cars, smart grids, health care, smart appliances, and advanced medical services, through fusions and combinations between existing Information Technology (IT) technology and various industries.

Accordingly, various attempts to apply a $5^{th}$ Generation (5G) communication system to an IoT network are being made. For example, 5G communication, such as a sensor network, M2M, and MTC, is implemented by a technique, such as beam forming, multi input multi output (MIMO), and an array antenna. Applying a cloud radio access network (CRAN) as big data processing technology also is an example of fusion of 5G technology and IoT technology.

As various services are provided with the development of mobile communication systems, as described above, users are capable of controlling or using various devices or services. Accordingly, the importance of security and authentication for connections between users' devices are is being emphasized.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for determining proximity of an external device.

Additional aspects will be set forth in part in the description which follows and, in part, will be apparent from the description, or may be learned by practice of the presented embodiments.

The disclosure relates to an electronic device for determining proximity of a wireless external device.

In accordance with an aspect of the disclosure, an electronic device is provided. The electronic device includes a transceiver, a sensor, and at least one processor, wherein the at least one processor is configured to transmit a first signal to the external device through the transceiver, acquire, when the first signal is transmitted, information about a user's gesture made in a vicinity of a sensor positioned within a certain distance from the transceiver through the sensor, wherein the first signal is distorted by the user's gesture and provided to the external device, receive, from the external device through the transceiver, a second signal generated as the external device copies the distorted first signal, and determine proximity of the external device based on the second signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
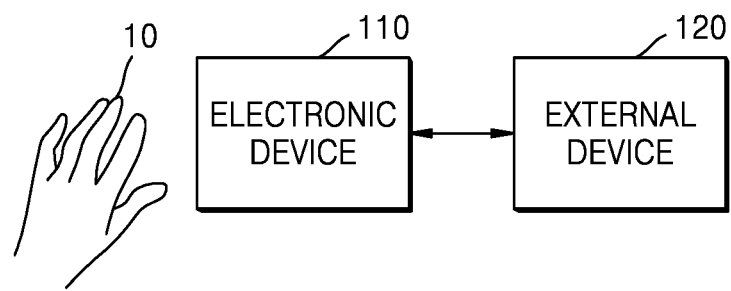
FIG. 1 is a block diagram illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Some embodiments of the disclosure may be represented by functional block configurations and various processing operations. Some or all of these functional blocks may be implemented with various numbers of hardware and/or software components that perform particular functions. For example, the functional blocks of the disclosure may be implemented by one or more microprocessors or circuit configurations for a given function. In addition, for example, the functional blocks of the disclosure may be implemented in various programming or scripting languages. The functional blocks may be implemented with algorithms running on one or more processors. The disclosure may also employ typical techniques for electronic environment settings, signal processing, and/or data processing.

In addition, connection lines or connection members between the components illustrated in the drawings are merely illustrative of functional connections and/or physical or circuit connections. In actual devices, connections between the components may be represented by various functional connections, physical connections, or circuit connections that may be replaced or added.

As used herein, the terms "portion", "module", or "unit" refers to a unit that can perform at least one function or operation, and may be implemented as hardware, software, or a combination of hardware and software. The "portion", "module", or "unit" may be stored in an addressable storage medium, or may be implemented by a program that can be executed by a processor.

In addition, relative terms, such as "on" or "upper" and "below" or "lower" may be used to describe relationships of certain elements to other elements as depicted in the drawings. Relative terms may be understood as intending the inclusion of other directions of a device in addition to directions illustrated in the drawings. For example, when a device is turned over in the drawings, elements illustrated to be present on surfaces of other elements may be oriented under the foregoing other elements. Thus, for example, the term "on" may include both directions of "below" and "on" relying on a particular direction of drawings. When an element is oriented in a different direction (rotated by 90 degrees with respect to the different direction), relative descriptions used in this disclosure may be interpreted accordingly.

Meanwhile, the embodiments of the disclosure disclosed in the present specification and drawings are specific examples to easily describe the technical ideas of the disclosure and help understanding of the disclosure, not intended to limit the scope of the disclosure. It will be apparent to those of ordinary skill in the art that various modified examples can be made based on the technical ideas of the disclosure. In addition, the embodiments of the disclosure may be combined and performed as necessary. For example, an embodiment of the disclosure and some parts of another embodiment of the disclosure may be combined to perform operations of a device.

FIG. 1 is a block diagram illustrating an electronic device according to an embodiment of the disclosure.

Referring to FIG. 1, an electronic device 110 may determine proximity of an external device 120. The electronic device 110 according to an embodiment of the disclosure may allow a connection to the external device 120 when the external device 120 is proximate to the electronic device 110, thereby preventing an attack from an attacker located at a remote place.

The electronic device 110 according to an embodiment of the disclosure may be a device which a user 10 uses. For example, the electronic device 110 may be a mobile phone, a smart phone, a personal digital assistant (PDA), a tablet, a wearable device, a display, a IoT device, an electronic circuit, a chipset, an electrical circuit (that is, a system on chip (SoC)), and the like. In addition, the electronic device 110 may be a device authenticated on the user's home network. Meanwhile, the external device 120 according to an embodiment of the disclosure may be a device to which the user wants to establish a connection through the electronic device 110.

Meanwhile, there may be an attacker's attacking device (not shown) that mimics the external device 120. The attacker's attacking device may be a device trying to intercept a connection of the electronic device 110 to the external device 120 to acquire information of the electronic device 110. Generally, the attacker's attacking device may be located at a long distance from the electronic device 110. The attacking device may mimic a device located close to the electronic device 110 by transmitting a broadcasting signal (for example, a beacon frame signal) of greater signal strength than the external device 120, although it is located at a long distance from the electronic device 110. Accordingly, to prevent such an attack from the attacking device, the electronic device 110 may determine physical proximity of the external device 120 that is a target to be connected to the electronic device 110. The electronic device 110 may use the determined proximity for an operation with respect to the external device 120, for example, a connection to the external device 120 or authentication of the external device 120.

The electronic device 110 according to an embodiment of the disclosure may transmit a first signal to the external device 120. The first signal may be a signal capable of measuring received signal strength (RSS). The first signal according to an embodiment of the disclosure may be a signal that is used to connect the electronic device 110 to the external device 120. For example, when the electronic device 110 is connected to the external device 120 by wireless-fidelity (Wi-Fi) or Bluetooth, the first signal may be a Wi-Fi signal or a Bluetooth signal. In this case, the electronic device 110 may be connected to the external device 120 by transmitting and receiving various connection information, such as a service set identifier (SSID) or a session key, to and from the external device 120. Alternatively, the first signal may be a signal based on various communication standards, such as the Institute of Electrical and Electrical Engineers (IEEE), Zigbee, $5^{th}$ Generation (5G), new radio (NR), $3^{rd}$ Generation Partnership Project (3GPP), long term evolution (LTE), or the first signal may be a near field communication (NFC) signal.

In the following embodiment of the disclosure, the first signal is assumed to be a Wi-Fi signal. However, technical characteristics of the first signal are not limited to these, and it will be understood by one of ordinary skill in the art that the first signal may be various types of signals of which received signal strengths may be measured.

The electronic device 110 may acquire information about the user's gesture, that is, the user's body movement, while the first signal is transmitted to the external device 120. The electronic device 110 according to an embodiment of the disclosure may use a sensor located within a certain distance from a transceiver transmitting the first signal to acquire information about the user's gesture made in a vicinity of the sensor.

Because the user's body is a conductor having weak conductivity, the user's body movement made while the first signal is transmitted may distort the first signal. Accordingly, the external device 120 may receive the first signal distorted by the user's gesture. Meanwhile, a change distorted by the user's gesture in the first signal may be measured as a degree depending on a distance between the external device 120 and the electronic device 110 which is a transmitter. For example, the distorted first signal received by the external device 120 may be an index for determining proximity between the external device 120 and the electronic device 110.

Meanwhile, the electronic device 110 according to an embodiment of the disclosure may further determine a type of the user's gesture. For example, the electronic device 110 may provide the user with a message requesting the user to make a specific gesture. For example, the electronic device 110 may display an image, text, a figure, a mark, and the like, implying a specific gesture on a display. Alternatively, the electronic device 110 may output a sound signal for requesting a word, a sentence, and the like, implying a specific gesture, through a speaker. In this case, the electronic device 110 may determine the user's gesture as the displayed specific gesture.

The electronic device 110 according to an embodiment of the disclosure may display images, text, figures, marks, and the like, implying a plurality of gestures on the display. The electronic device 110 may determine a gesture of the plurality of gestures as a type of the user's gesture, based on an input from the user.

The electronic device 110 according to an embodiment of the disclosure may determine a type of the user's gesture by using information about the user's gesture acquired through the sensor.

The external device 120 according to an embodiment of the disclosure may copy the received, distorted first signal to generate a second signal and transmit the second signal to the electronic device 110. The electronic device 110 may determine proximity of the external device 120, based on the second signal received from the external device 120.

The electronic device 110 according to an embodiment of the disclosure may receive the first signal distorted by the user's gesture while the first signal is transmitted. For example, the signal received by the electronic device 110 may correspond to the distorted first signal received by an external device located at a distance of 0 m from the electronic device 110. The electronic device 110 may compare the received, distorted first signal to the second signal to determine proximity of the external device 120.

The electronic device 110 according to an embodiment of the disclosure may predict a distorted first signal that is to be received by the external device being proximate to the electronic device 110, based on the first signal and the acquired information about the user's gesture. The electronic device 110 may compare the predicted signal to the second signal to determine proximity of the external device 120. The electronic device 110 according to an embodiment of the disclosure may predict a distorted first signal that is to be received by the external device being proximate to the electronic device 110, by using a pre-trained training model.

The electronic device 110 according to an embodiment of the disclosure may acquire a pre-stored signal pattern based on the determined type of the user's gesture. The pre-stored signal pattern may be a plurality of predetermined types of gestures and a plurality of distorted first signal patterns received by an external device being proximate to the electronic device corresponding to the predetermined types of gestures. The predetermined types of gestures and the signal patterns corresponding to the predetermined types of gestures may be stored in a form of a database. The electronic device 110 may store the database in a memory or acquire the database from a server or a network. The electronic device 110 may compare the pre-stored signal pattern to the second signal to determine proximity of the external device 120.

Meanwhile, because the first signal according to an embodiment of the disclosure is used to connect the electronic device 110 to the external device 120, the electronic device 110 and the external device 120 may need not to include an additional connection method or signal protocol for determining proximity. Accordingly, the electronic device 110 may determine proximity of the external device 120, while efficiently establishing a connection to the external device 120 without consuming additional cost.

Figure 2:
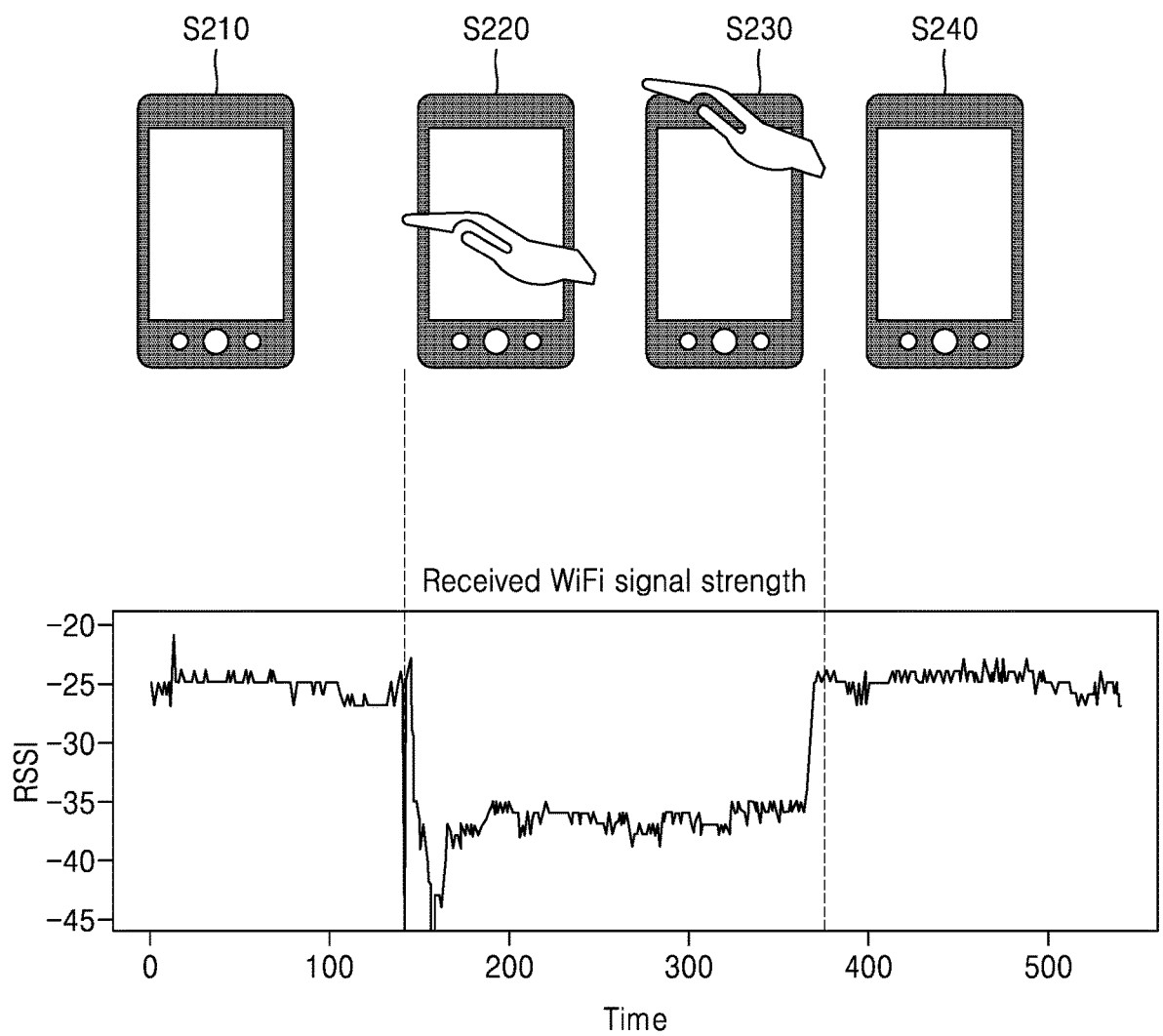
FIG. 2 is a view illustrating distortion of a first signal according to an embodiment of the disclosure.

FIG. 2 is a view illustrating distortion of the first signal according to an embodiment of the disclosure.

Referring to FIG. 2, a user's gesture and received signal strength of the first signal distorted by the user's gesture are shown.

In operation S210, the first signal may start being transmitted. In operation S210, because the user does not yet make any gesture, a portion of the first signal transmitted in operation S210 may be not distorted.

In operations S220 and S230, the user may make a gesture. In FIG. 2, a motion of swiping the electronic device 110 from bottom to top is shown. By the user's gesture, a portion of the first signal transmitted in operations S220 and S230 may be distorted, as shown in a graph of FIG. 2. Meanwhile, distortion generated by the user's gesture may be measured as different values in proportion to distances from the electronic device 110 which is a transmitter, as described above with reference to FIG. 1. In operation S240, transmission of the first signal ends.

Figure 3:
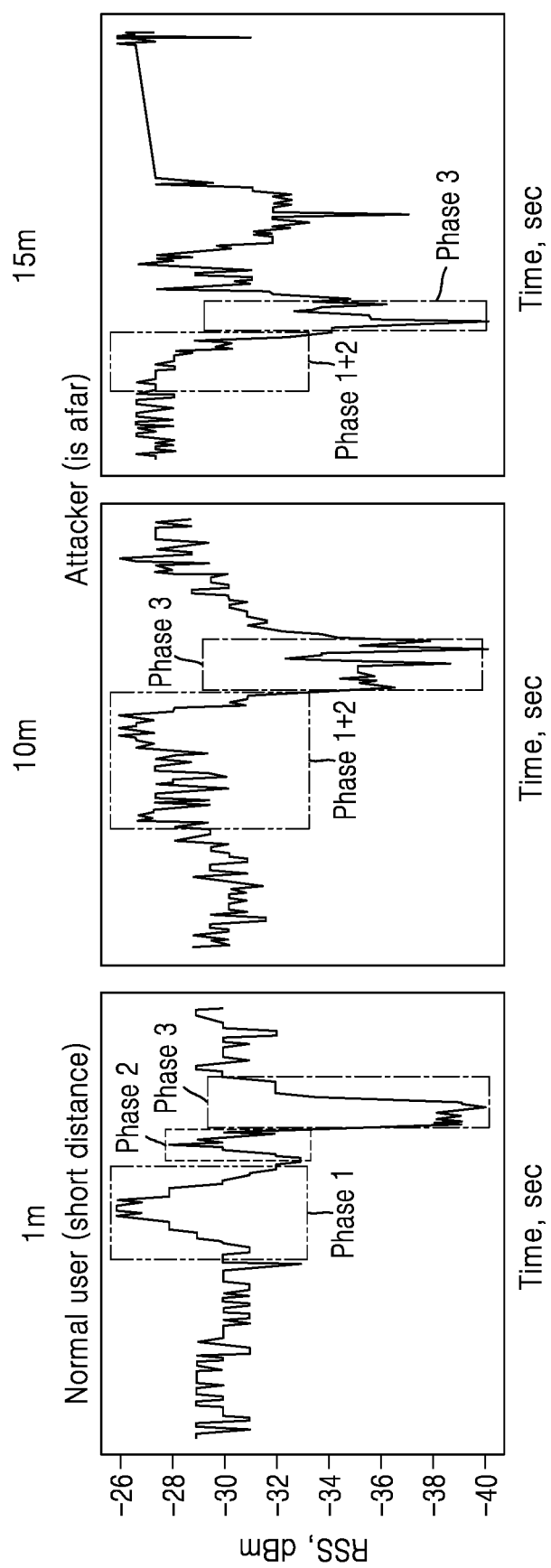
FIG. 3 is a view illustrating received signal strengths of a distorted first signal based on distances from an electronic device according to an embodiment of the disclosure.

FIG. 3 is a view illustrating received signal strengths of the distorted first signal based on distances from the electronic device 110 according to an embodiment of the disclosure. In FIG. 3, a motion of swiping the electronic device 110 from bottom to top is used as a gesture.

Referring to FIG. 3, when the first signal is transmitted to external devices located at distances of 1 m, 10 m, and 15 m from the electronic device 110, reception results of the first signal by the external devices are shown.

The first signal that is distorted by a user's gesture may have a plurality of phases having different characteristics, based on the user's moving body and a change in distance from the transceiver. In the embodiment of the disclosure of FIG. 3, a first phase may represent a phase in which the first signal is distorted by a motion of moving the user's hand to the transceiver positioned at a top end of the electronic device 110, a second phase may represent a phase in which the first signal is distorted by a motion of moving the user's hand in a vicinity of the transceiver, and a third phase may represent a phase in which the first signal is distorted by a motion of moving the user's hand away from the transceiver.

As shown in FIG. 3, the distorted first signal received by the external device located at the distance of 1 m from the electronic device 110 may include all signals having characteristics of the first phase, the second phase, and the third phase. In this case, the external device located at the distance of 1 m from the electronic device 110 may be determined as an electronic device being proximate to the electronic device 110.

Meanwhile, in the distorted first signal received by the external device located at the distance of 10 m from the electronic device 110, the signal having the characteristic of the first phase and the signal having the characteristic of the second phase may be diluted and included so that the signals are not distinguished from each other, as shown in FIG. 3. In the distorted first signal received by the external device located at the distance of 15 m from the electronic device 110, the signal having the characteristic of the first phase and the signal having the characteristic of the second phase may be more diluted and included so that the signals are not distinguished from each other, as shown in FIG. 3. In this case, the external devices located at the distances of 10 m and 15 m from the electronic device 110 may be determined as external devices located at a long distance from the electronic device 110.

For example, the distorted first signals received by the external devices located at a long distance from the electronic device 110 may be less influenced by distortion by the user's gesture. Accordingly, the distorted first signal received by an external device and the second signal generated by copying the distorted first signal may be indices for determining proximity between the external device and the electronic device 110.

Figure 4:
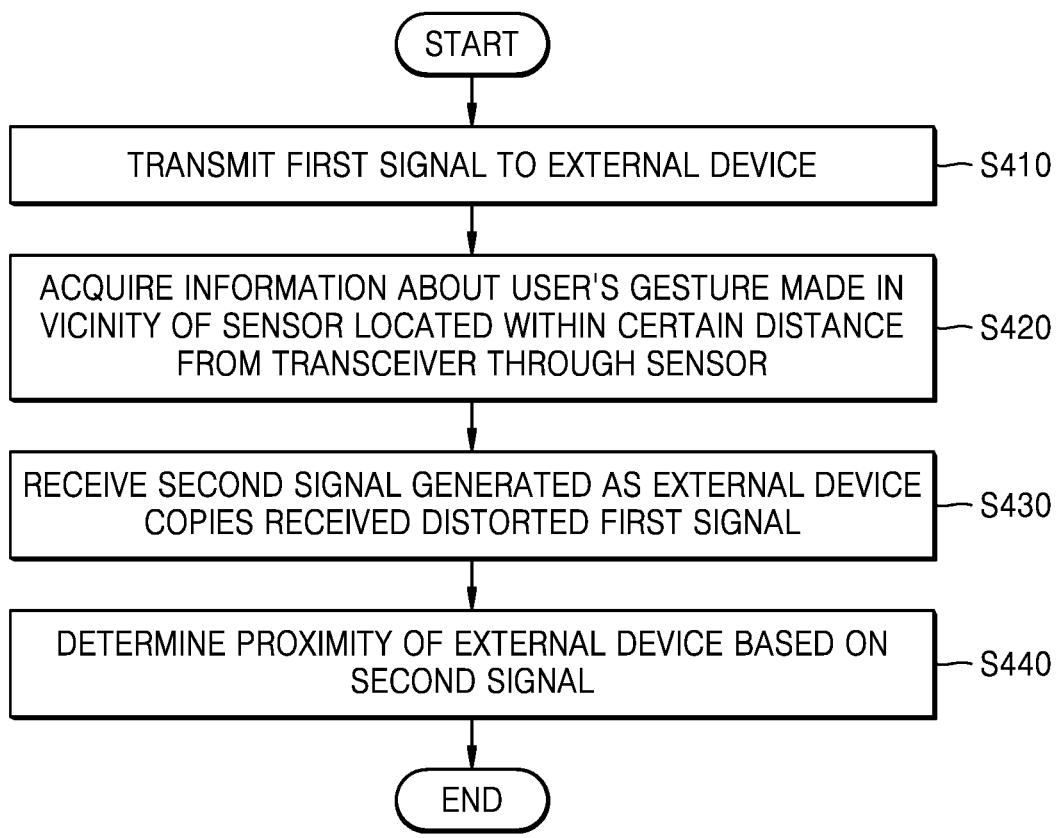
FIG. 4 is a flowchart illustrating a method of determining proximity between an electronic device and an external device according to an embodiment of the disclosure.

FIG. 4 is a flowchart illustrating a method of determining proximity between an electronic device and an external device according to an embodiment of the disclosure.

Referring to FIG. 4, the electronic device may determine proximity of the external device by using distortion of a signal caused by a user's gesture.

In operation S410, a first signal may be transmitted from the electronic device to the external device. The first signal may be a signal capable of measuring received signal strength. The first signal according to an embodiment of the disclosure may be a signal that is used for a connection between the electronic device and the external device.

In operation S420, information about a user's gesture made in a vicinity of a sensor located within a certain distance from a transceiver of the electronic device may be acquired through the sensor. The user's gesture according to an embodiment of the disclosure may be the user's body movement. The user's body movement made while the first signal is transmitted may distort the first signal. Accordingly, the external device may receive the first signal distorted by the user's gesture.

In operation S430, the electronic device may receive a second signal generated as the external device copies the distorted first signal.

In operation S440, proximity between the external device and the electronic device may be determined based on the second signal. The electronic device according to an embodiment of the disclosure may again receive the first signal distorted by the user's gesture while the first signal is transmitted. The electronic device may compare the received, distorted first signal to the second signal to determine proximity of the external device.

The electronic device according to an embodiment of the disclosure may predict a distorted first signal that is to be received by an external device being proximate to the electronic device, based on the first signal and the acquired information about the user's gesture. The electronic device may compare the predicted first signal to the second signal to determine proximity of the external device.

The electronic device according to an embodiment of the disclosure may acquire a pre-stored signal pattern based on a determined type of the user's gesture. The electronic device may compare the pre-stored signal pattern to the second signal to determine proximity of the external device.

For example, the electronic device may determine proximity of the external device based on a correlation between the pre-stored signal pattern and the second signal. For example, when the electronic device determines that a correlation between the pre-stored signal pattern and the second signal is greater than or equal to a certain threshold value, the electronic device may determine that the external device is proximate to the electronic device. Meanwhile, when the electronic device determines that the correlation between the pre-stored signal pattern and the second signal is smaller than or equal to the certain threshold value, the electronic device may determine that the external device is not proximate to the electronic device.

The electronic device according to an embodiment of the disclosure may normalize the second signal. More specifically, the second signal may include a signal copied from a portion of the first signal distorted by the user's gesture and a signal copied from a portion of the first signal not distorted. The electronic device may separate a portion related to the user's gesture from the second signal in unit of a time domain. For example, the electronic device may determine a time interval in which the user's gesture is made, based on the information about the user's gesture. The electronic device may separate a portion of the second signal corresponding to the determined time interval from the second signal in unit of the time domain. The electronic device may normalize the separated portion of the second signal so that a signal characteristic caused by the user's gesture emerges clearly.

Figure 5:
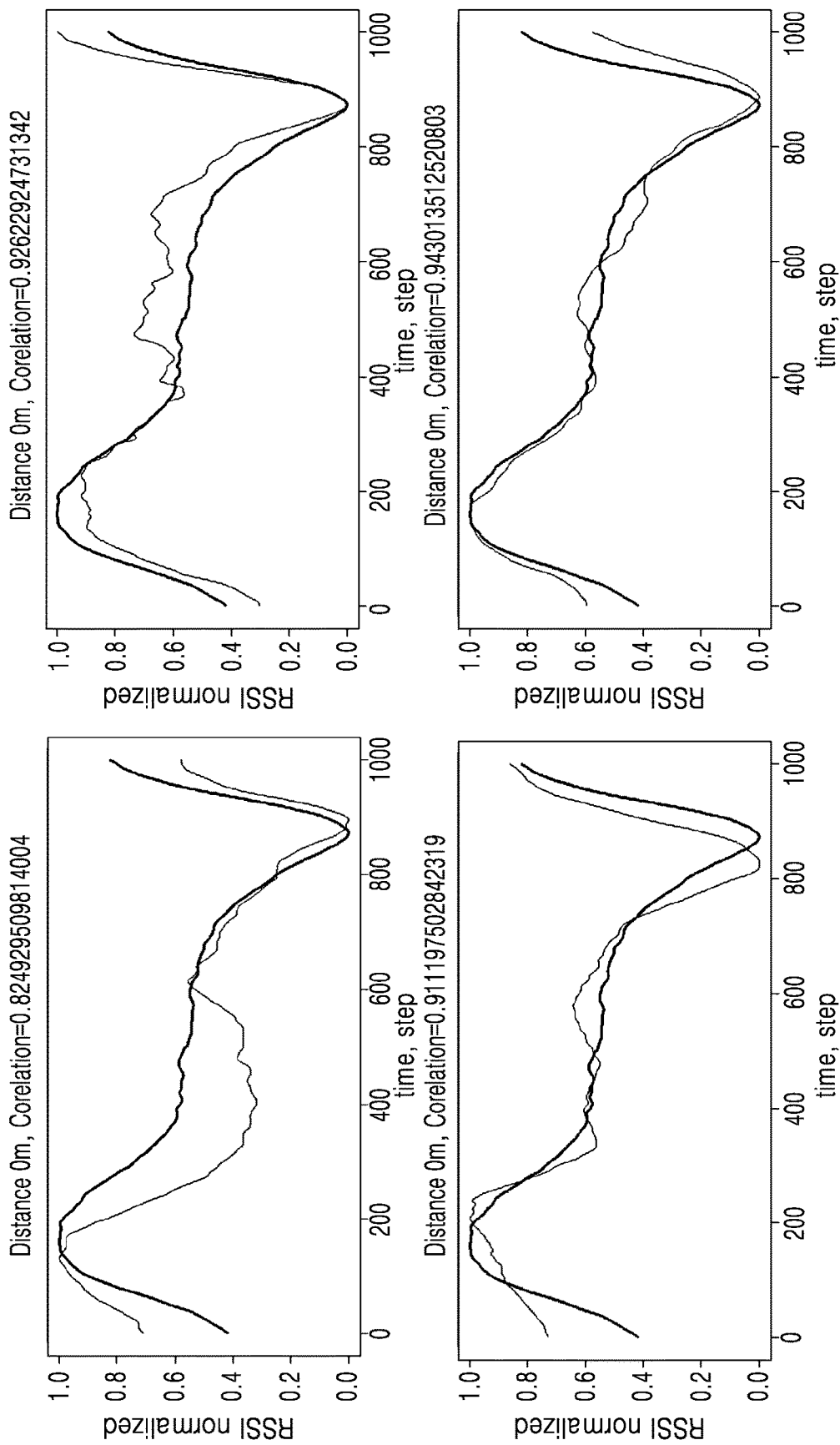
FIG. 5 illustrates a correlation between a second signal and a pre-stored signal pattern according to an embodiment of the disclosure.
Figure 6:
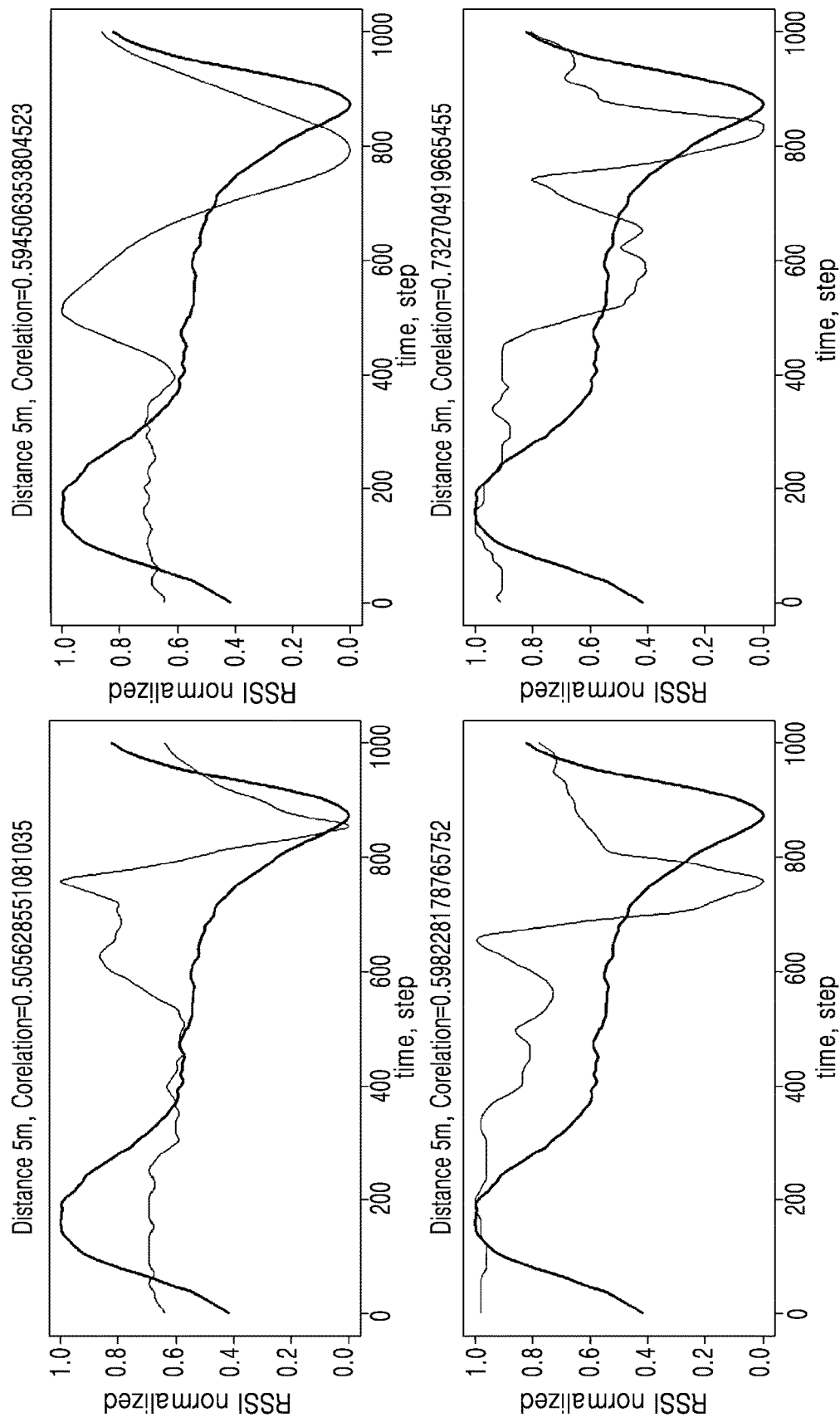
FIG. 6 illustrates a correlation between a second signal and a pre-stored signal pattern according to an embodiment of the disclosure.
Figure 7:
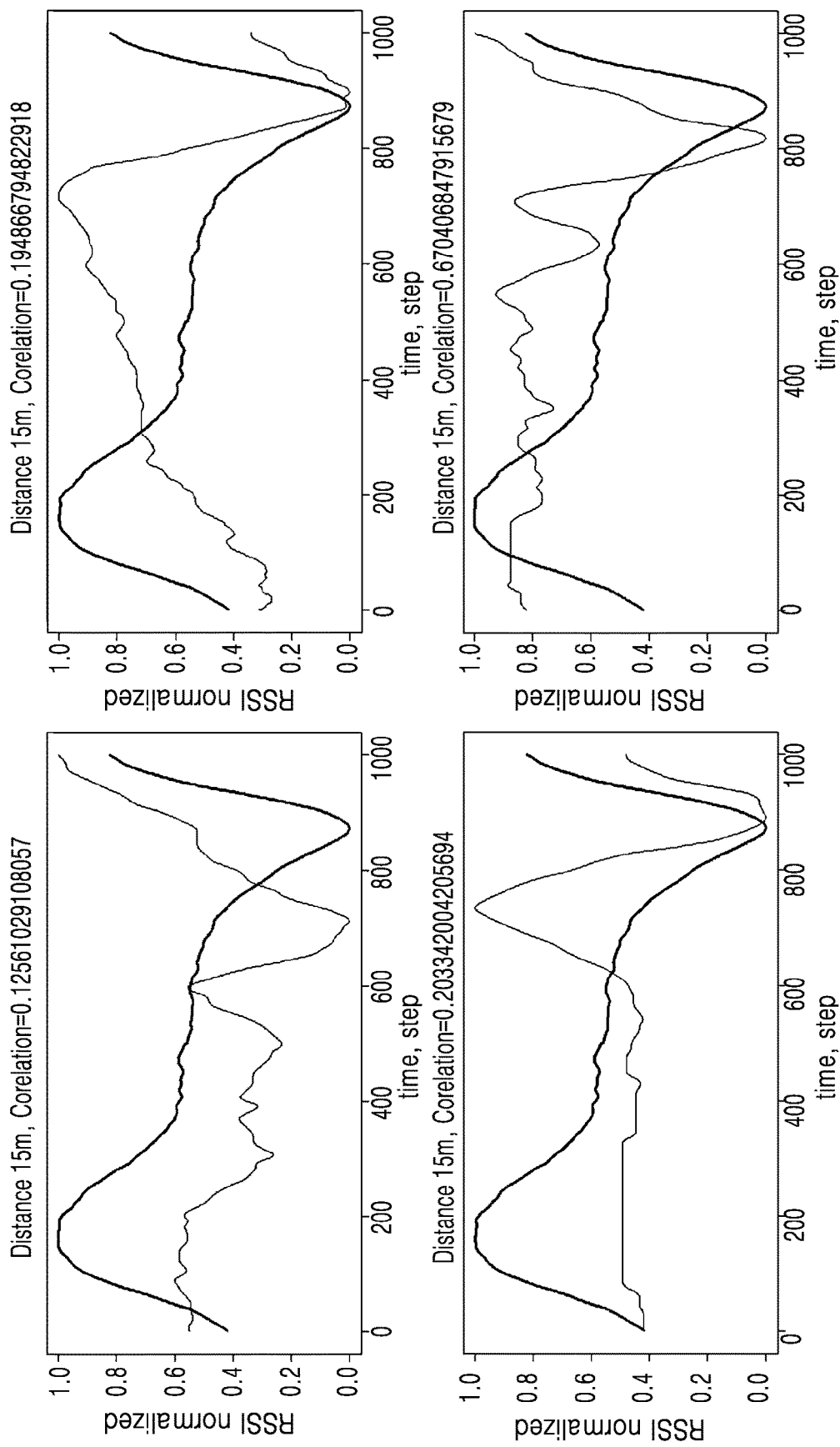
FIG. 7 illustrates a correlation between a second signal and a pre-stored signal pattern according to an embodiment of the disclosure.

FIGS. 5 to 7 are views illustrating a determination on proximity based on the second signal according to various embodiments of the disclosure.

FIG. 5 illustrates a correlation between a second signal and a pre-stored signal pattern according to an embodiment of the disclosure.

Referring to FIG. 5, a normalized signal of a second signal received from an external device located at a distance of 0 m from the electronic device, and a pre-stored signal pattern are shown.

A correlation between the second signal and the pre-stored signal pattern may change based on a distance between the electronic device and the external device, a velocity of a user's gesture, a shape of the user's gesture, and the like. However, even under various environments, a correlation between the second signal received from the external device located at the distance of 0 m from the electronic device and the pre-stored signal pattern may be measured as a great value of 0.8 or greater, as shown in FIG. 5. Accordingly, the external device may be determined to be proximate to the electronic device.

FIG. 6 illustrates a correlation between a second signal and a pre-stored signal pattern according to an embodiment of the disclosure.

Referring to FIG. 6, a normalized signal of a second signal received from an external device located at a distance of 5 m from the electronic device and a pre-stored signal pattern are shown.

Referring to FIG. 5, a correlation between the second signal and the pre-stored signal pattern may be lower than the correlation between the second signal and the pre-stored signal pattern of FIG. 5. Accordingly, the external device may be determined to be not proximate to the electronic device.

FIG. 7 illustrates a correlation between a second signal and a pre-stored signal pattern according to an embodiment of the disclosure.

Referring to FIG. 7, a normalized signal of a second signal received from an external device located at a distance of 15 m from the electronic device and a pre-stored signal pattern are shown.

Referring to FIG. 7, a correlation between the second signal received from the external device located at the distance of 15 m from the electronic device and the pre-stored signal pattern may be lower than the correlation between the second signal and the pre-stored signal pattern of FIG. 5. Accordingly, the external device may be determined to be not proximate to the electronic device.

Figure 8:
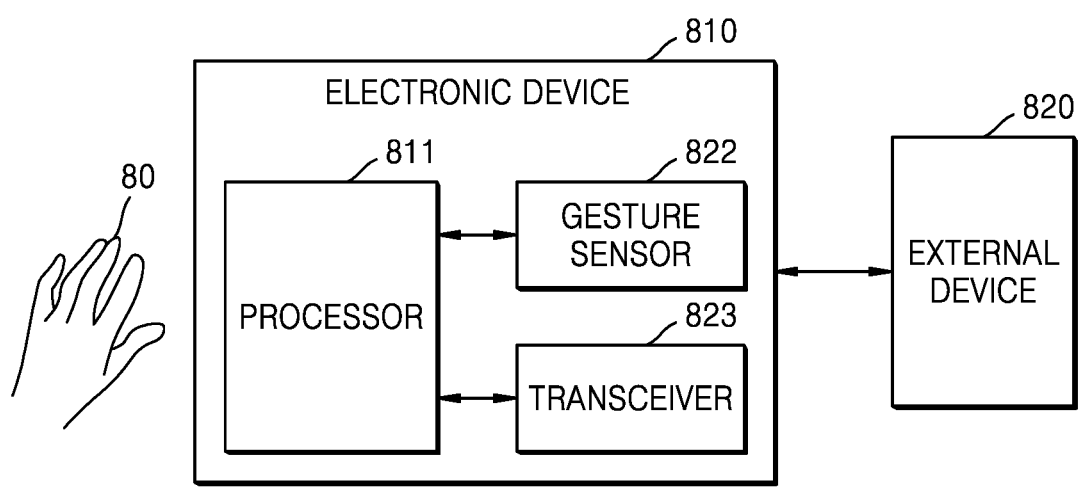
FIG. 8 is a block diagram illustrating an electronic device according to an embodiment of the disclosure.

FIG. 8 is a block diagram illustrating an electronic device according to an embodiment of the disclosure.

Referring to FIG. 8, an electronic device 810 may include a processor 811, a gesture sensor 822, and a transceiver 823.

The electronic device 810 may determine proximity of an external device 820. The electronic device 810 according to an embodiment of the disclosure may allow a connection to the external device 820 when the external device 820 is proximate to the electronic device 810, thereby preventing an attack from an attacker.

The processor 811 may control overall operations of the electronic device 810. The processor 811 may perform basic arithmetic operations, logic operations, and input/output operations to process at least one instruction. The instruction may be provided from a memory (not shown) to the processor 811. For example, the processor 811 may be configured to execute an instruction according to a program code stored in a recording device, such as a memory. Alternatively, the instruction may be provided to the processor 811 through the transceiver 823.

The processor 811 may control the transceiver 823 to transmit a first signal to the external device 820. The first signal may be a signal capable of measuring received signal strength. The first signal according to an embodiment of the disclosure may be a signal that is used for a connection between the electronic device 810 and the external device 820.

The processor 811 may control the gesture sensor 822 to acquire information about a gesture of a user 80, that is, a body movement of the user 80, while the first signal is transmitted to the external device 820. The gesture sensor 822 may be positioned within a certain distance from the transceiver 823. The gesture sensor 822 according to an embodiment of the disclosure may be a touch display, a touch pad, a proximity sensor, a temperature sensor, a camera, an optical sensor, a microphone, or a reception antenna of the transceiver 823. The gesture sensor 822 positioned within the certain distance from the transceiver 823 may include a reception antenna of the transceiver 823. In this case, the electronic device 810 may acquire distortion of the first signal caused by a gesture of the user 80 as information about the gesture of the user 80, without using a separate sensor. However, it will be understood by one of ordinary skill in the art that the gesture sensor 822 according to an embodiment of the disclosure is not limited to the above-described example.

Meanwhile, the external device 820 may receive the distorted first signal from the electronic device 810. The external device 820 may copy the received, distorted first signal to acquire a second signal. The external device 820 may transmit the second signal to the electronic device 810.

The electronic device 810 may determine proximity of the external device 820, based on the second signal received from the external device 820.

Meanwhile, the electronic device 810 may use an operation of determining proximity of the external device 820 for various operations with respect to the external device 820.

The electronic device 810 according to an embodiment of the disclosure may use the above-described operation of determining proximity to establish a connection to the external device 820. To establish the connection to the external device 820, the electronic device 810 may transmit and receive existing security information, for example, various connection information, such a SSID and a session key, to and from the external device 820. In addition to an existing operation of establishing a connection, the electronic device 810 may perform the operation of determining proximity of the external device 820. The electronic device 810 may allow a connection to the external device 820 determined to be proximate to the electronic device 810.

The electronic device 810 according to an embodiment of the disclosure may use the operation of determining proximity to transmit and receive security data, for example, a file that the user 80 wants to share to and from the external device 820. The electronic device 810 according to an embodiment of the disclosure may allow transmission/reception of security data, for example, picture data to/from the external device 820 determined to be proximate to the electronic device 810.

The electronic device 810 according to an embodiment of the disclosure may use the operation of determining proximity to unlock or lock the external device 820. According to an embodiment of the disclosure, a lock state may be a sleep state or a state in which at least a part of functions is not executed. The electronic device 810 according to an embodiment of the disclosure may unlock the external device 820 determined to be proximate to the electronic device 810, or again lock the external device 820 unlocked.

The electronic device 810 according to an embodiment of the disclosure may use the operation of determining proximity to control functions of the external device 820. The electronic device 810 according to an embodiment of the disclosure may control an operation of the external device 820 determined to be proximate to the electronic device 810 to adjust the operation.

Figure 9:
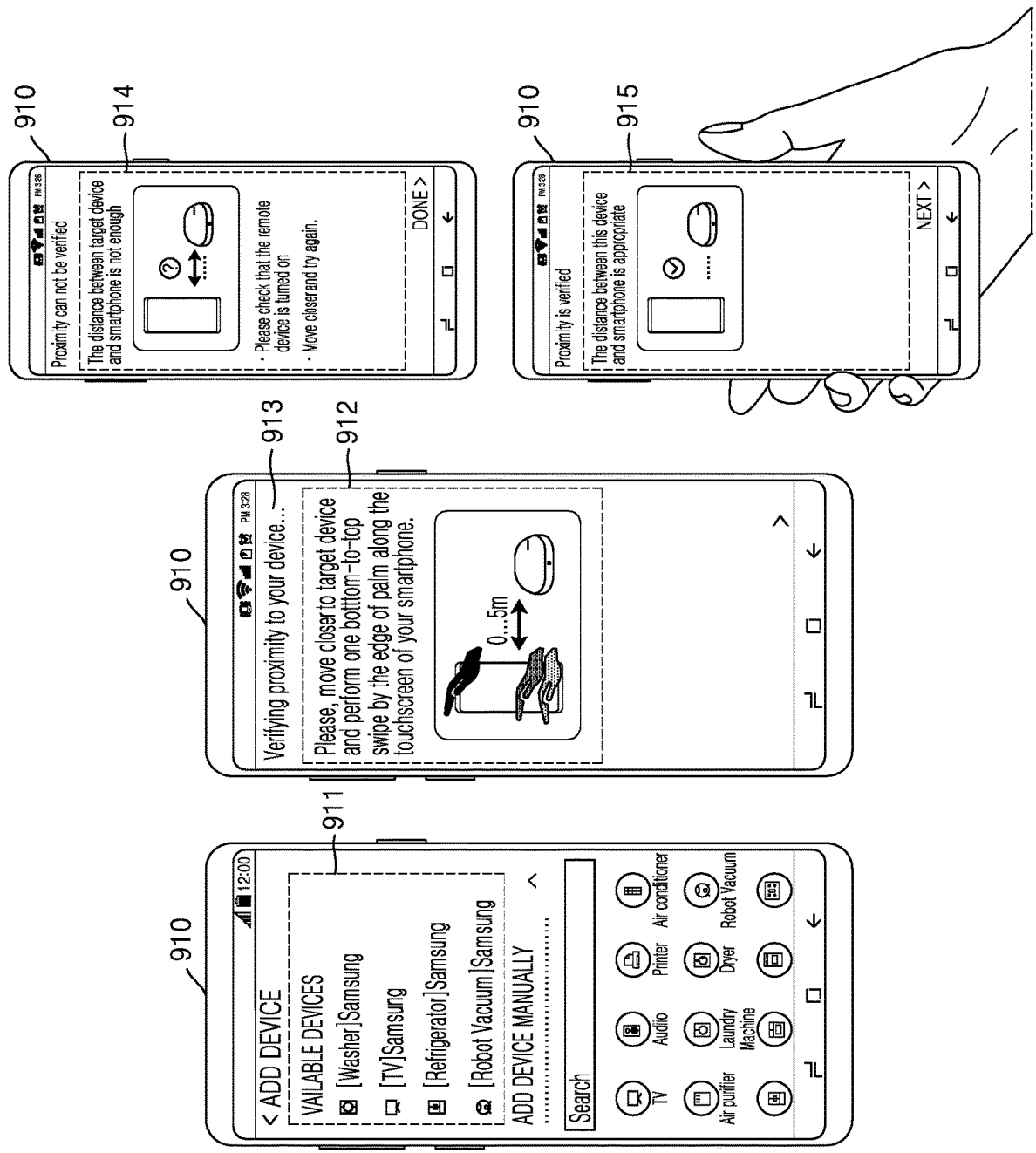
FIG. 9 is a view illustrating a connection establishment method using an operation of determining proximity according to an embodiment of the disclosure.

FIG. 9 is a view illustrating a connection establishment method using an operation of determining proximity according to an embodiment of the disclosure.

Referring to FIG. 9, an electronic device 910 may search for available devices located in a vicinity of the electronic device 910. The electronic device 910 may display a list 911 of the available devices. According to an embodiment of the disclosure, the list 911 of the available devices may be displayed in a form of text corresponding to the individual devices, images corresponding to the individual devices, or combinations of text and images corresponding to the individual devices. The electronic device 910 may identify a device to which a user tries to establish a connection from among the available devices, based on the user's input.

The electronic device 910 may establish an initial connection to the identified device, and then perform an operation of determining proximity of the identified device according to an embodiment of the disclosure. More specifically, the electronic device 910 may transmit a first signal to the identified device, and simultaneously display a message 912 requesting the user to input a gesture. The message 912 according to an embodiment of the disclosure may include text representing a type of a gesture, an image representing the type of the gesture, or a combination of text and an image representing the type of the gesture.

Meanwhile, the electronic device 910 may further display a notice message 913 notifying that the operation of determining proximity is being currently performed.

When the electronic device 910 determines that the identified device is not proximate to the electronic device 910, the electronic device 910 may display a warning message 914. The warning message 914 according to an embodiment of the disclosure may include a message requesting the user to reduce a distance to the identified device and then perform a retry. When the electronic device 910 determines that the identified device is not proximate to the electronic device 910, the electronic device 910 may terminate the initial connection to the identified device.

When the electronic device 910 determines that the identified device is proximate to the electronic device 910, the electronic device 910 may establish a connection to the identified device. The electronic device 910 may display a message 915 notifying that a connection has been established.

According to an embodiment of the disclosure, the identified device to which the electronic device 910 establishes a connection may be one of various devices including a wearable device, a speaker, a peripheral device, such as a camera, and the like.

Figure 10:
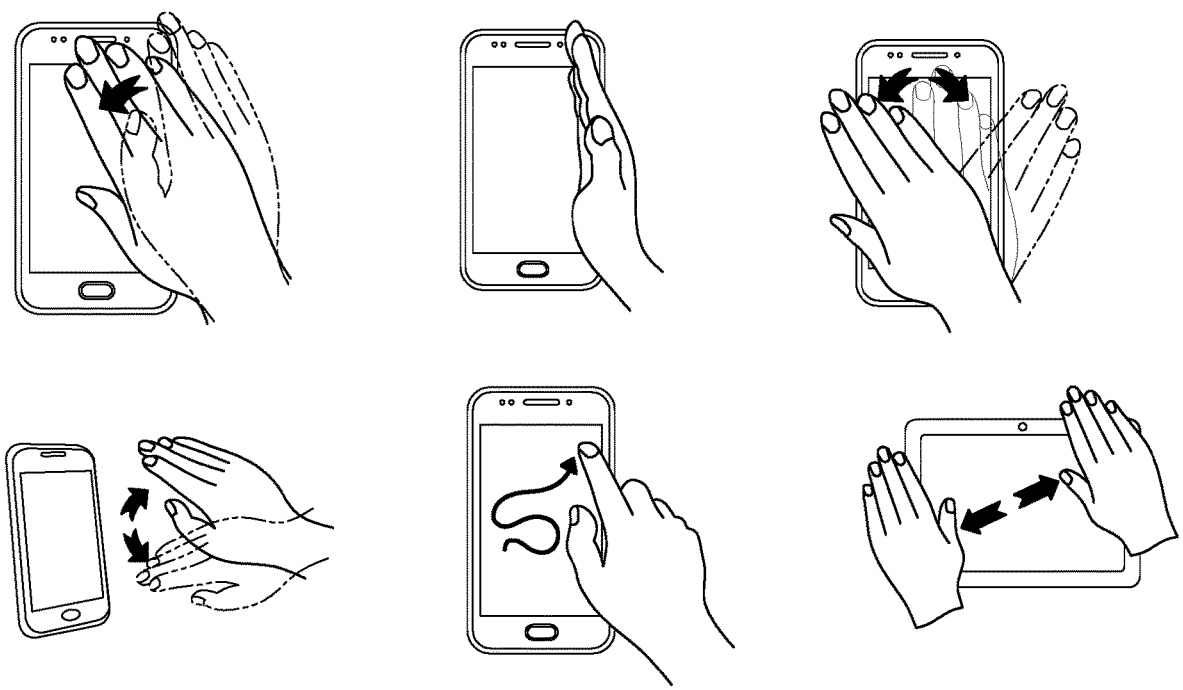
FIG. 10 is a view illustrating a user's gesture according to an embodiment of the disclosure.

FIG. 10 is a view illustrating a user's gesture according to an embodiment of the disclosure.

The electronic device 910 may request a user to make various types of gestures. The electronic device 910 according to an embodiment of the disclosure may acquire a plurality of predetermined signal patterns corresponding to the various types of gestures.

Referring to FIG. 10, the electronic device 910 may request the user to make at least one type of gesture of a tap motion (bending a hand forward and then raising the hand), a swipe motion (moving a hand in a up/down/left/right direction as though it sweeps), a shake motion (shaking a hand horizontally or vertically), a turn motion (turning a hand in a clockwise/counterclockwise direction) a tracing motion (tracing a hand's movement in real time), or a bimanual motion. However, it will be understood by one of ordinary skill in the art that the electronic device 910 according to an embodiment of the disclosure may request the user to make other various types of gestures.

Figure 11:
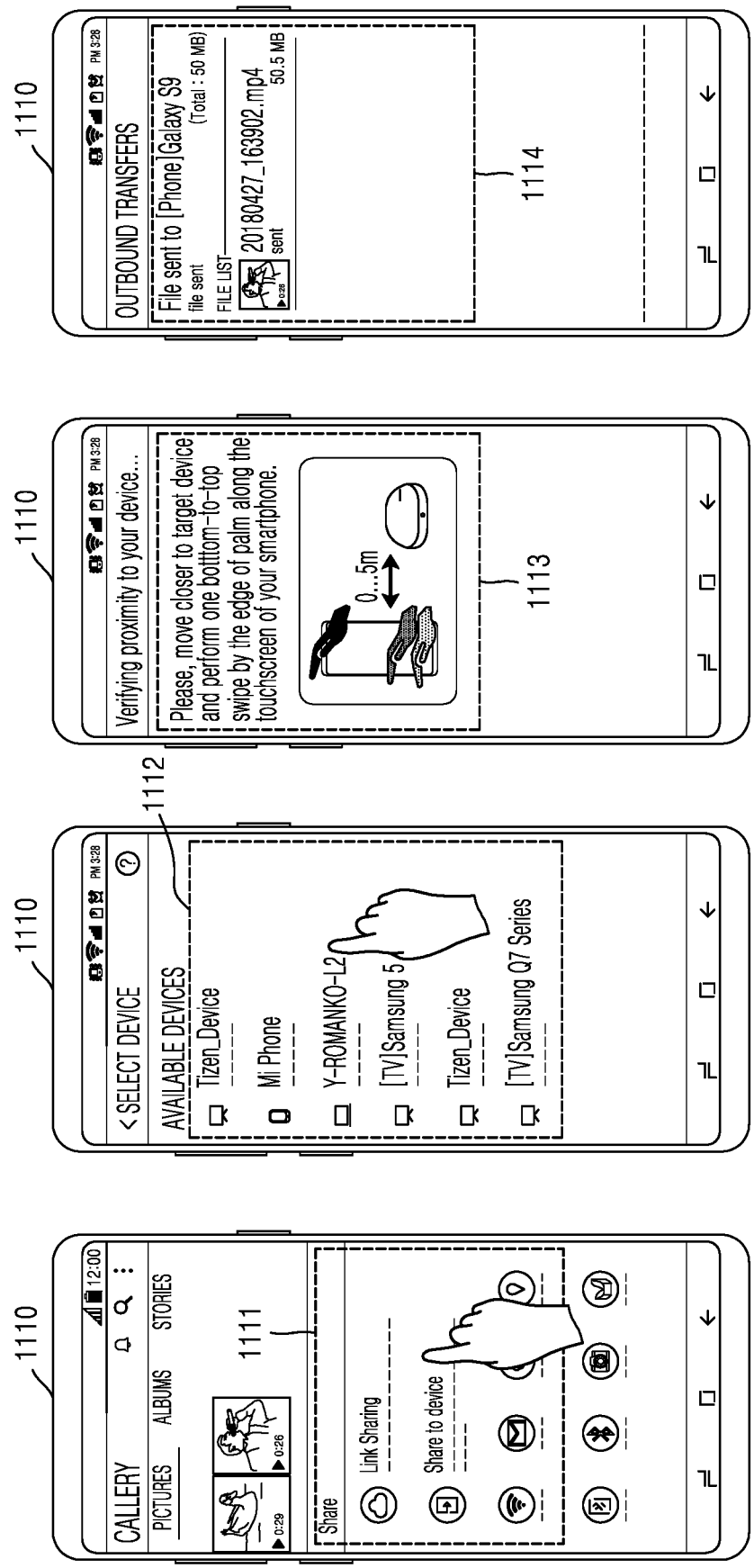
FIG. 11 is a view illustrating a security data transmission method using an operation of determining proximity according to an embodiment of the disclosure.

FIG. 11 is a view illustrating a security data transmission method using an operation of determining proximity according to an embodiment of the disclosure.

Referring to FIG. 11, an electronic device 1110 may execute various applications. The applications according to an embodiment of the disclosure may include camera photographing, an image album, multimedia play, document generation or reading, a navigation, and the like. While an application is executed, the electronic device 1110 may display a message 1111 for transmitting security data to an external device. The security data according to an embodiment of the disclosure may be a user's private data, such as a picture, document, a video, and the like. An operation of transmitting security data to the external device may include an operation of sharing a file with the external device. The message 1111 according to an embodiment of the disclosure may be provided in a form of a pop-up menu.

The electronic device 1110 may display a list 1112 of available devices to which the security data is allowed to be transmitted. According to an embodiment of the disclosure, the list 1112 of available devices may be displayed in a form of text corresponding to the individual devices, images corresponding to the individual devices, or combinations of text and images corresponding to the individual devices. The electronic device 1110 may identify a device to which a user tries to transmit the security data from among the available devices, based on the user's input.

The electronic device 1110 may establish an initial connection to the identified device, and then perform an operation of determining proximity of the identified device, according to an embodiment of the disclosure. More specifically, the electronic device 1110 may transmit a first signal to the identified device, and simultaneously display a message 1113 requesting the user to input a gesture. The message 1113 according to an embodiment of the disclosure may include text representing a type of a gesture, an image representing the type of the gesture, or a combination of text and an image representing the type of the gesture.

Meanwhile, the electronic device 1110 may further display a notice message notifying that the operation of determining proximity is being currently performed.

When the electronic device 1110 determines that the identified device is not proximate to the electronic device 1110, the electronic device 1110 may display a warning message. The warning message according to an embodiment of the disclosure may include a message requesting the user to reduce a distance to the identified device and then perform a retry. When the electronic device 1110 determines that the identified device is not proximate to the electronic device

1110, the electronic device 1110 may terminate the initial connection to the identified device.

When the electronic device 1110 determines that the identified device is proximate to the electronic device 1110, the electronic device 1110 may provide the security data to the identified device. The electronic device 1110 may display a message 1114 notifying that transmission has been completed.

Figure 12:
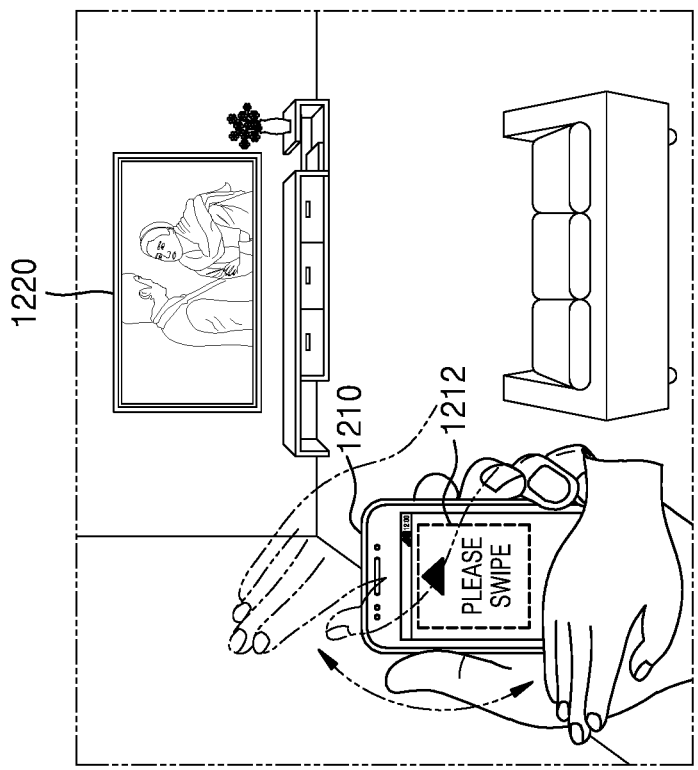
FIG. 12 is a view illustrating an unlocking method using an operation of determining proximity according to an embodiment of the disclosure.
Figure 12:
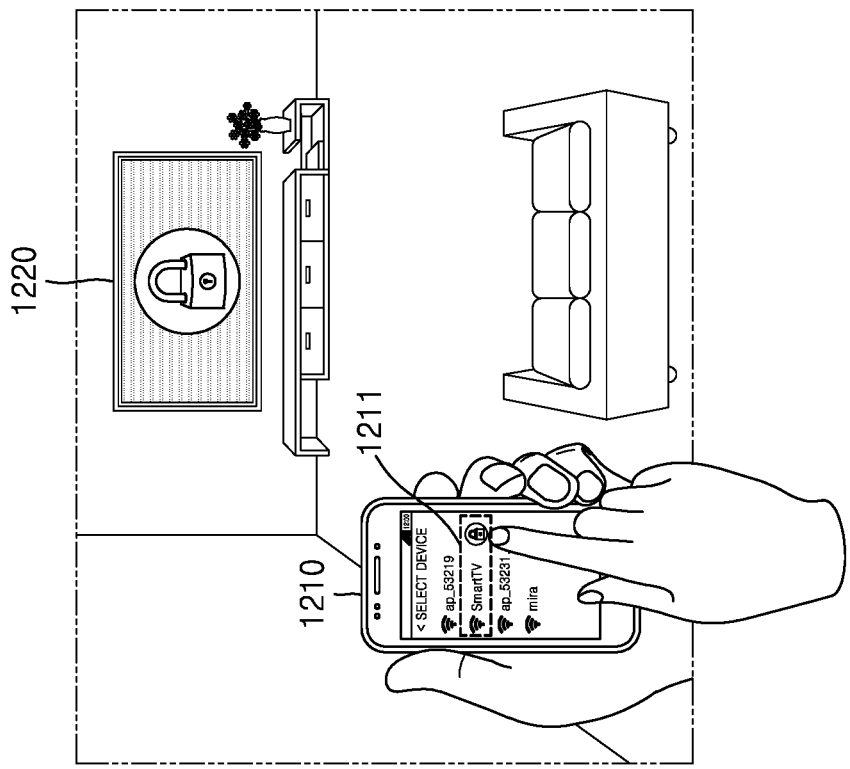

FIG. 12 is a view illustrating an unlocking method using an operation of determining proximity according to an embodiment of the disclosure.

Referring to FIG. 12, an electronic device 1210 may search for devices allowed to be unlocked or locked from among devices located in a vicinity of the electronic device 1210. The electronic device 1210 according to an embodiment of the disclosure may display a list 1211 of the devices allowed to be unlocked or locked. According to an embodiment of the disclosure, the list 1211 of the devices allowed to be unlocked or locked may be displayed in a form of text corresponding to the individual devices, images corresponding to the individual devices, or combinations of text and images corresponding to the individual devices. The electronic device 1210 may identify a device 1220 which a user tries to unlock or lock from among the devices allowed to be unlocked or locked, based on the user's input.

The electronic device 1210 may establish an initial connection to the identified device 1220, and then perform an operation of determining proximity of the identified device 1220, according to an embodiment of the disclosure. More specifically, the electronic device 1210 may transmit a first signal to the identified device 1220, and simultaneously display a message 1212 requesting the user to input a gesture. The message 1212 according to an embodiment of the disclosure may include text representing a type of a gesture, an image representing the type of the gesture, or a combination of text and an image representing the type of the gesture. Meanwhile, the electronic device 1210 may further display a notice message notifying that the operation of determining proximity is being currently performed.

When the electronic device 1210 determines that the identified device 1220 is not proximate to the electronic device 1210, the electronic device 1210 may display a warning message. The warning message according to an embodiment of the disclosure may include a message requesting the user to reduce a distance to the identified device and then perform a retry. When the electronic device 1210 determines that the identified device 1220 is not proximate to the electronic device 1210, the electronic device 1210 may terminate the initial connection to the identified device 1220.

When the electronic device 1210 determines that the identified device 1220 is proximate to the electronic device 1210, the electronic device 1210 may transmit a signal for requesting unlocking to the identified device 1220. The signal may include a signal representing that proximity between the electronic device 1210 and the identified device 1220 has been verified. The identified device 1220 may be unlocked in response to the request from the electronic device 1210.

According to an embodiment of the disclosure, the identified device 1220 to which the electronic device 1210 establishes a connection may be one of various devices including a wearable device, a speaker, a peripheral device, such as a camera, a smart electronic device connected to a home network, and the like.

Figure 13:
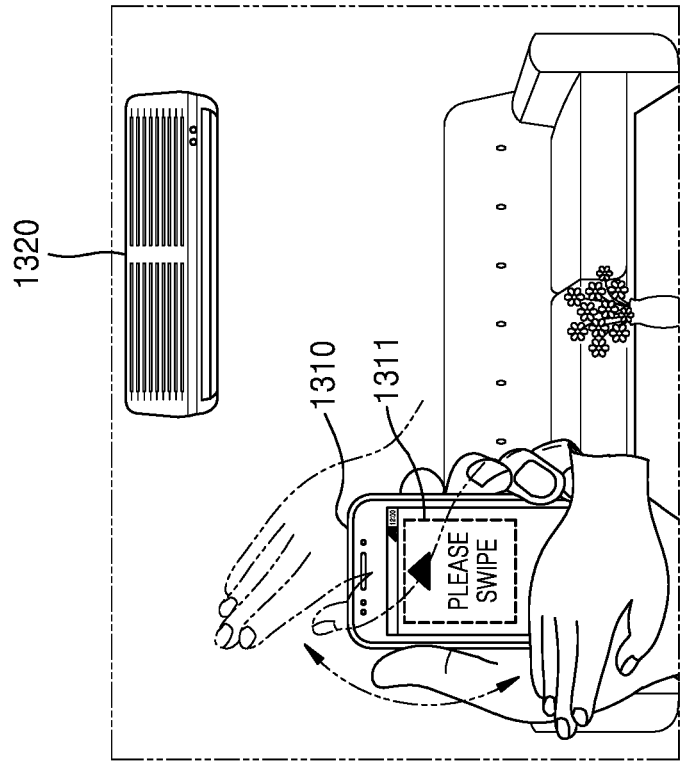
FIG. 13 is a view illustrating an external device control method using an operation of determining proximity according to an embodiment of the disclosure.
Figure 13:
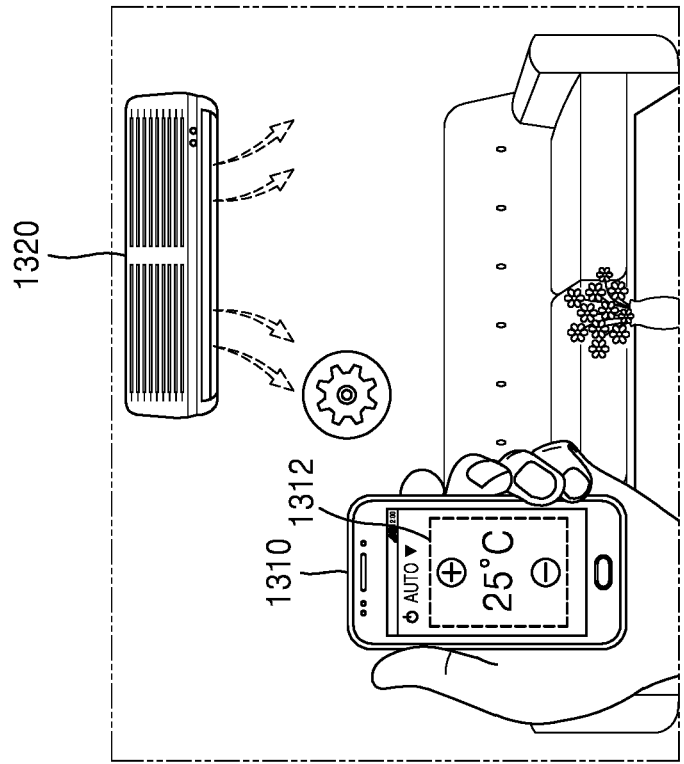

FIG. 13 is a view illustrating an external device control method using an operation of determining proximity according to an embodiment of the disclosure.

Referring to FIG. 13, an electronic device 1310 may search for controllable devices located in a vicinity of the electronic device 1310. The electronic device 1310 may display a list of the controllable devices. According to an embodiment of the disclosure, the list of the controllable devices may be displayed in a form of text corresponding to the individual devices, images corresponding to the individual devices, or combination of text and images corresponding to the individual devices. The electronic device 1310 may identify a device to which a user tries to establish a connection from among the controllable devices, based on the user's input.

The electronic device 1310 may establish an initial connection to the identified device 1320, and then perform an operation of determining proximity of the identified device 1320, according to an embodiment of the disclosure. More specifically, the electronic device 1310 may transmit a first signal to the identified device 1320, and simultaneously display a message 1311 requesting the user to input a gesture. The message 1311 according to an embodiment of the disclosure may include text representing a type of a gesture, an image representing the type of the gesture, or a combination of text and an image representing the type of the gesture.

Meanwhile, the electronic device 1310 may further display a notice message notifying that the operation of determining proximity is being currently performed.

When the electronic device 1310 determines that the identified device 1320 is not proximate to the electronic device 1310, the electronic device 1310 may display a warning message. The warning message according to an embodiment of the disclosure may include a message requesting the user to reduce a distance to the identified device 1320 and then perform a retry. When the electronic device 1310 determines that the identified device 1320 is not proximate to the electronic device 1310, the electronic device 1310 may terminate the initial connection to the identified device 1320.

When the electronic device 1310 determines that the identified device 1320 is proximate to the electronic device 1310, the electronic device 1310 may display a control interface 1312 for the identified device 1320. The control interface 1312 according to an embodiment of the disclosure may provide an interface for controlling operations of the identified device 1320. Meanwhile, the control interface 1312 may further include a message representing a current state of the identified device 1320.

For example, when the identified device 1320 is an air conditioner, the control interface 1312 may display current temperature and symbols corresponding to temperature adjustment buttons, on and off buttons, and the like, of the air conditioner. When the identified device 1320 is a speaker, the control interface 1312 may display information about multimedia being currently played and symbols corresponding to volume adjusting buttons, on and off buttons, and the like. The symbols may be various shapes of visualized information including images, text, and the like. The electronic device 1310 may control an operation of the identified device 1320 based on the user's input using the control interface 1312.

Figure 14:
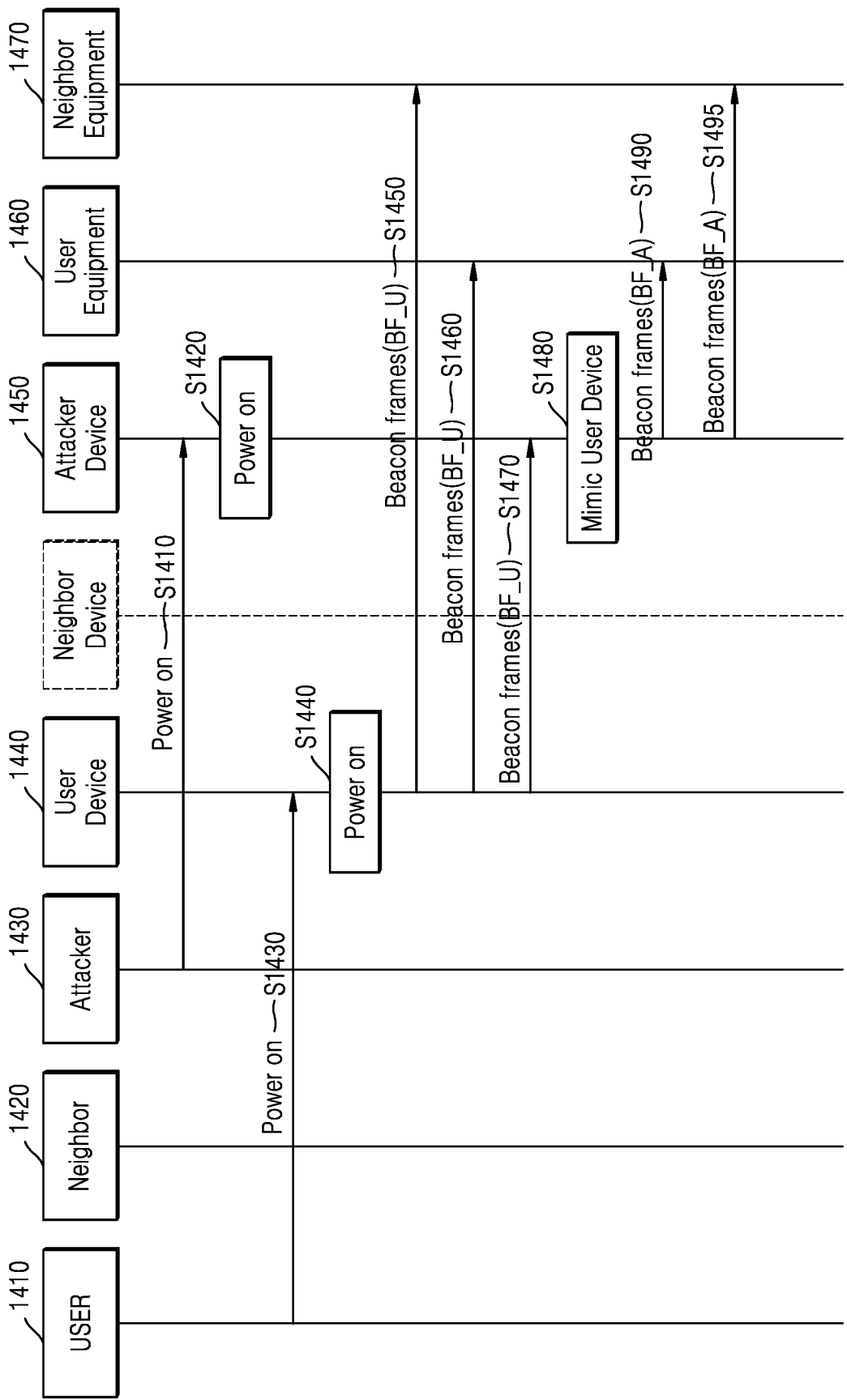
FIG. 14 is a view illustrating initialization processes of devices according to an embodiment of the disclosure.
Figure 15:
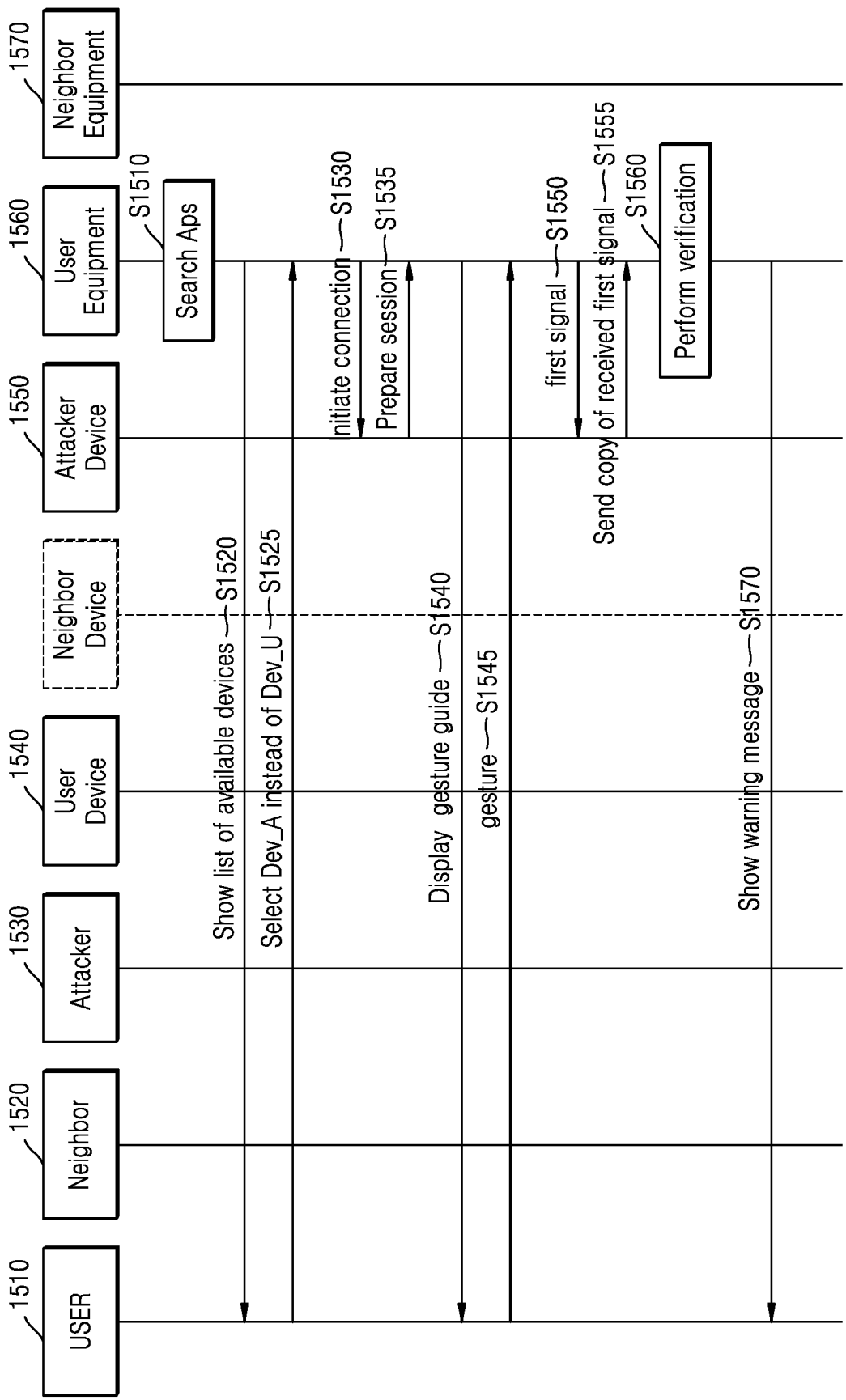
FIG. 15 is a view illustrating a process of preventing attack by an attacker according to an embodiment of the disclosure.
Figure 16:
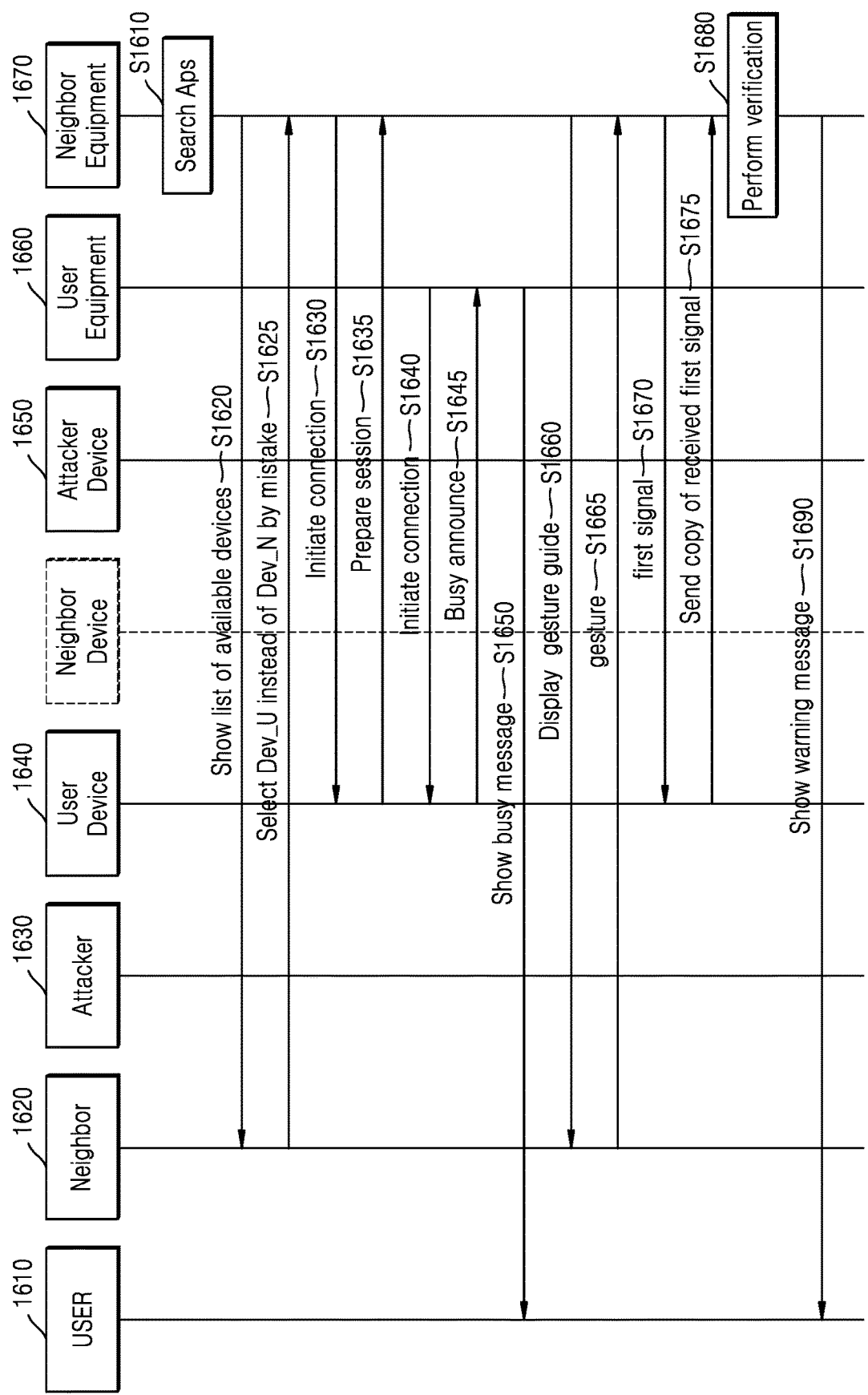
FIG. 16 is a view illustrating a process of preventing wrong connection by a neighbor according to an embodiment of the disclosure.

FIGS. 14 to 16 are views illustrating a connection establishment method using an operation of determining proximity according to various embodiments of the disclosure. In FIGS. 14 to 16, a user may be a normal user that wants to connect to the user's device by using the user's equipment. A neighbor may be a normal user that tries to connect to the user's device by a wrong connection, although the neighbor wants to connect to the neighbor's device by using the neighbor's equipment. An attacker may be a malicious user that tries to cause the user's equipment to connect to the attacker's device.

FIG. 14 is a view illustrating initialization processes of devices according to an embodiment of the disclosure.

Referring to FIG. 14, in operation S1410, an attacker 1430 may provide a power-on signal to an attacker device 1450, and accordingly, the attacker device 1450 may be powered on, in operation S1420. The powered-on attacker device 1450 may listen to a neighboring network to search for a surrounding device that is a victim.

In operation S1430, a user 1410, having a neighbor 1420, may provide a power-on signal to a user device 1440, and accordingly, the user device 1440 may be powered on, in operation S1440. The powered-on user device 1440 may function as an access point (AP). The user device 1440 may initialize the AP, and prepare to broadcast information about an initial connection including its own identification information. In the following embodiment of the disclosure, the information about the initial connection may be a beacon frame. However, it will be understood by one of ordinary skill in the art that the technical feature of the current embodiment of the disclosure is not limited to a beacon frame.

In operations S1450 to S1470, the user device 1440 may broadcast the beacon frame. Information broadcasted by the user device 1440 may arrive at the attacker device 1450, user equipment 1460, and neighbor equipment 1470, located at a place at which signals from the user device 1440 arrive.

When the attacker device 1450 receives the beacon frame from the user device 1440, the attacker device 1450 may prepare to mimic the user device 1440, in operation S1480. More specifically, the attacker device 1450 may receive the information broadcasted by the user device 1440 and analyze the information. The attacker device 1450 may broadcast a beacon frame for mimicking the user device 1440 in such a way to broadcast the beacon frame with greater strength than that of the beacon frame transmitted from the user device 1440.

In operations S1490 and S1495, information broadcasted by the attacker device 1450 may arrive at the user equipment 1460 and the neighbor equipment 1470. Meanwhile, the user equipment 1460 and the neighbor equipment 1470 may try to connect to the attacker device 1450 before trying to connect to the user device 1440, because strength of a signal broadcasted from the attacker device 1450 is greater than strength of a signal broadcasted from the user device 1440.

FIG. 15 is a view illustrating a process of preventing attack by an attacker according to an embodiment of the disclosure.

Referring to FIG. 15, a user may try to connect to a user device 1540 by using a user equipment 1560 having a neighbor equipment 1570. However, like a situation described above with reference to FIG. 14, the user equipment 1560 may be enticed to establish a connection to an attacker device 1550.

Referring to FIG. 15, in operation S1510, the user equipment 1560 may search for surrounding devices to establish a connection.

In operation S1520, the user equipment 1560 may display a list of available devices. In operation S1525, the user equipment 1560 may select the attacker device 1550 mimicking the user device 1540 as a connection target device, in response to an input from a user 1510 having a neighbor 1520 and an attacker 1530.

In operation S1530, the user equipment 1560 may prepare to establish an initial connection to the attacker device 1550. In operation S1535, the attacker device 1550 may prepare to establish a session, for example, start handshake. At this time, the attacker device 1550 mimicking the user device 1540 may request the user equipment 1560 to perform an operation of determining proximity, like the user device 1540.

In operation S1540, the user equipment 1560 may display a guide requesting a gesture to determine proximity of the attacker device 1550. In operation S1545, the user may make a gesture according to the guide.

In operation S1550, the user equipment 1560 may transmit a first signal to the attacker device 1550. Because the user's gesture is being made, the first signal may be distorted by the user's gesture and then transmitted to the attacker device 1550. In operation S1555, the attacker device 1550 may copy the received, distorted first signal to generate a second signal, and transmit the second signal to the user equipment 1560.

In operation S1560, the user equipment 1560 may determine proximity of the attacker device 1550, based on the second signal. Because the second signal provided from the attacker device 1550 has a low correlation to the user's gesture, the user equipment 1560 may determine that the attacker device 1550 is not proximate to the user equipment 1560. Accordingly, the user equipment 1560 may terminate the initial connection to the attacker device 1550.

In operation S1570, the user equipment 1560 may display a warning message notifying that the connection target device is not proximate to the user equipment 1560.

FIG. 16 is a view illustrating a process of preventing wrong connection by a neighbor according to an embodiment of the disclosure.

Referring to FIG. 16, a neighbor may try to connect to a neighbor device by using a neighbor equipment 1670. However, the neighbor equipment 1670 may be induced by mistake to establish a connection to a user device 1640.

Referring to FIG. 16, in operation S1610, the neighbor equipment 1670 may search for surrounding devices to establish a connection.

In operation S1620, the neighbor equipment 1670 may display a list of available devices. In operation S1625, the neighbor equipment 1670 may select the user device 1640 as a connection target device, in response to an input from a neighbor 1620 located next to an attacker 1630.

In operation S1630, the neighbor equipment 1670 may prepare to establish an initial connection to the user device 1640. In operation S1635, the user device 1640 may prepare to establish a session, for example, start handshake. The user device 1640 may request the neighbor equipment 1670 to perform an operation of determining proximity.

Meanwhile, in operation S1640, a user equipment 1660, located next to an attacker device 1650, may also prepare to establish an initial connection to the user device 1640. However, because the neighbor equipment 1670 is establishing a connection to the user device 1640, the user device 1640 may announce a busy state to the user equipment 1660, in operation S1645. Alternatively, the user device 1640 may respond to the request (first connection request) from the neighbor equipment 1670, and not respond to the request from the user equipment 1660.

In operation S1650, the user equipment 1660 may display a busy message notifying that the user device 1640 is in a busy state. The busy message according to an embodiment of the disclosure may include a message requesting a retry.

In operation S1660, the neighbor equipment 1670 may display a guide requesting a gesture to determine proximity of the user device 1640. In operation S1665, the neighbor may make the gesture according to the guide.

In operation S1670, the neighbor equipment 1670 may transmit a first signal to the user device 1640. Because the neighbor is making the gesture, the first signal may be distorted by the neighbor's gesture and then transmitted to the user device 1640. In operation S1675, the user device 1640 may copy the received, distorted first signal to generate a second signal, and transmit the second signal to the neighbor equipment 1670.

In operation S1680, the neighbor equipment 1670 may determine proximity of the user device 1640 based on the second signal. Because the second signal provided from the user device 1640 has a low correlation to the neighbor's gesture, the neighbor equipment 1670 may determine that the user device 1640 is not proximate to the neighbor equipment 1670. Accordingly, the neighbor equipment 1670 may terminate the initial connection to the user device 1640.

In operation S1690, the neighbor equipment 1670 may display a warning message notifying that the connection target device is not proximate to the neighbor equipment 1670.

The electronic device according to an embodiment of the disclosure may be a server, a computing device, a smart phone, a tablet personal computer (PC), a PC, a smart television (TV), a mobile phone, a personal digital assistant (PDA), a laptop, a media player, a micro server, a global positioning system (GPS) system, an e-book terminal, a terminal for digital broadcasting, a navigation system, a kiosk, a moving picture experts group phase 1 or phase 2 (MPEG-1 or MPEG-2) audio layer 3 (MP3) player, a digital camera, a home appliance, or another mobile or non-mobile computing device, although not limited thereto. In addition, the electronic device may be a wearable device, such as a watch, glasses, a hair band, and a ring, including a communication function and a data processing function. However, the electronic device is not limited to the above-mentioned devices, and may include all kinds of devices for determining proximity.

In addition, the electronic device may communicate with a server and another device (not shown) through a certain network to acquire or output results from a database or a training model. In this case, the network may include a local area network (LAN), a wide area network (WAN), a value added network (VAN), a mobile radio communication network, a satellite communication network, and a combination thereof. The network may be a data communication network of a comprehensive meaning, which enables stable communications between components configuring the network, and may include the wired Internet, the wireless Internet, and a mobile wireless communication network. The wireless communication may be, for example, a wireless LAN (Wi-Fi), Bluetooth, Bluetooth low energy (BLE), Zigbee, Wi-Fi direct (WFD), ultra-wideband (UWB), infrared data association (IrDA), NFC, and the like, although not limited thereto.

Some embodiments of the disclosure may be implemented as a software (S/W) program including instructions stored in computer-readable storage media.

For example, the computer may be a device that can call a stored instruction from the storage media, and perform operations according to the disclosed embodiments of the disclosure based on the instruction, and may include a device according to the disclosed embodiments of the disclosure or an external server communicatively connected to the device.

The computer-readable storage media may be provided in a form of non-transitory storage media. Herein, 'non-transitory' means that the storage media do not include a signal and current and are tangible, without meaning that data is semi-permanently or temporarily stored in the storage media. For example, the non-transitory storage media may include temporary storage media, such as a register, a cache, and a buffer, as well as non-transitory readable storage media, such as a compact disc (CD), a digital versatile disc (DVD), a hard disc, a blue-ray disc, a universal serial bus (USB), an internal memory, a memory card, a read only memory (ROM) or a random access memory (RAM).

In addition, the method according to the disclosed embodiments of the disclosure may be provided as a computer program product.

The computer program product may include a S/W program, computer-readable storage media storing a S/W program, or a product traded between a seller and a purchaser.

For example, the computer program product may include a S/W program product (for example, a downloadable application) electronically distributed through a manufacturing company of a device or an electronic market (for example, Google Play Store or App Store). For electronic distribution, at least one part of the software program may be stored in storage media or temporarily created. In this case, the storage media may be a server of a manufacturing company, a server of an electronic market, or storage media of a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an electronic device, of authenticating an external device, the method comprising:
    transmitting a first signal through a transceiver, wherein:
        the first signal is distorted by a user's gesture,
        the first signal distorted by the user's gesture is received by the external device as a first distorted signal, and
        the external device copies the received first distorted signal to generate a second distorted signal and transmits the second distorted signal to the electronic device;
    acquiring, while the first signal is transmitted, information about the user's gesture through a gesture sensor;
    acquiring a distortion pattern corresponding to the information about the user's gesture;
    receiving the second distorted signal from the external device;
    determining a correlation between the second distorted signal and the distortion pattern corresponding to a type of the user's gesture; and
    authenticating the external device based on a proximity between the external device and the electronic device determined based on the correlation.

2. The method of claim 1, wherein the acquiring of the distortion pattern corresponding to the information about the user's gesture comprises:
    determining the type of the user's gesture; and acquiring the distortion pattern corresponding to the type of the user's gesture based on the type of the user's gesture.

3. The method of claim 2, wherein the determining of the type of the user's gesture comprises:
displaying a message implying a certain gesture; and
determining the certain gesture as the type of the user's gesture.

4. The method of claim 3, wherein the certain gesture is a motion of swiping a space on the electronic device.

5. The method of claim 1, wherein the first signal is used to connect the electronic device to the external device.

6. The method of claim 5, wherein the first signal is a wireless-fidelity (Wi-Fi) signal.

7. The method of claim 1, further comprising:
displaying a user interface displaying a list of at least one external device to which the electronic device is connectable through wireless communication;
acquiring a device selection signal for selecting another external device from among the at least one external device through the user interface; and
selecting the other external device of which proximity is to be determined, based on the device selection signal.

8. The method of claim 7, further comprising allowing a wireless communication connection to the selected another external device based on a result of determining the proximity of the selected another external device.

9. The method of claim 1, further comprising displaying a message notifying that an operation of determining the proximity is being currently performed.

10. The method of claim 1,
wherein the acquiring of the information about the user's gesture comprises receiving the first distorted signal through a reception antenna of the transceiver while the first signal is transmitted, and
wherein the determining of the proximity of between the external device and the electronic device comprises comparing the received first distorted signal with the received second distorted signal.

11. The method of claim 1, wherein the determining of the proximity between the external device and the electronic device comprises:
predicting the first distorted signal that is to be received by an external device being proximate to the electronic device, hereafter referred to as a predicted first distorted signal, based on the first signal and the acquired information about the user's gesture, and
comparing the predicted first distorted signal with the received second distorted signal.

12. The method of claim 1, wherein the determining of the proximity between the external device and the electronic device comprises comparing the received second distorted signal with a distorted signal pattern corresponding to the first distorted signal.

13. An electronic device for authenticating an external device, the electronic device comprising:
a transceiver;
a gesture sensor; and
at least one processor configured to:
transmit a first signal through the transceiver, wherein:
the first signal is distorted by a user's gesture,
the first signal distorted by the user's gesture is received by the external device as a first signal distorted, and
the external device copies the received first distorted signal to generate a second distorted signal and transmits the second distorted signal to the electronic device,
acquire, while the first signal is transmitted, information about the user's gesture through the gesture sensor,
acquire a distortion pattern corresponding to the information about the user's gesture,
receive, through the transceiver, the second distorted signal generated from the external device,
determine a correlation between the second distorted signal and the distortion pattern corresponding to a type of the user's gesture, and
authenticate the external device based on a proximity between the external device and the electronic device determined based on the correlation.

14. The electronic device of claim 13, wherein the at least one processor is further configured to:
determine the type of the user's gesture, and
acquire the distortion pattern corresponding to the type of the user's gesture based on the type of the user's gesture.

15. The electronic device of claim 14, wherein the at least one processor is further configured to:
display a message implying a certain gesture, and
determine the certain gesture as the type of the user's gesture.

16. The electronic device of claim 15, wherein the certain gesture is a motion of swiping a space on the electronic device.

17. The electronic device of claim 13, wherein the first signal is used to connect the electronic device to the external device.

18. The electronic device of claim 17, wherein the first signal is a wireless-fidelity (Wi-Fi) signal.

19. The electronic device of claim 13, wherein the at least one processor is further configured to:
display a user interface displaying a list of at least one external device to which the electronic device is connectable through wireless communication,
acquire a device selection signal for selecting another external device from among the at least one external device through the user interface, and
select the other external device of which proximity is to be determined, based on the device selection signal.

20. The electronic device of claim 19, wherein the at least one processor is further configured to allow a wireless communication connection to the selected another external device based on a result of determining the proximity of the selected another external device.

21. The electronic device of claim 13, wherein the at least one processor is further configured to display a message notifying that an operation of determining proximity is being currently performed.

* * * * *